Oct. 17, 1967   R. D. LIVINGSTON   3,347,479
MULTIPLE WINDER WITH AUTOMATIC BROKEN THREAD RETRIEVAL
Filed Oct. 7, 1965   15 Sheets-Sheet 3

INVENTOR.
Richard D. Livingston,
BY
Wolfe, Hubbard, Voit & Osann
ATTORNEYS.

Oct. 17, 1967     R. D. LIVINGSTON     3,347,479
MULTIPLE WINDER WITH AUTOMATIC BROKEN THREAD RETRIEVAL
Filed Oct. 7, 1965     15 Sheets-Sheet 5

INVENTOR.
Richard D. Livingston,
BY
ATTORNEYS.

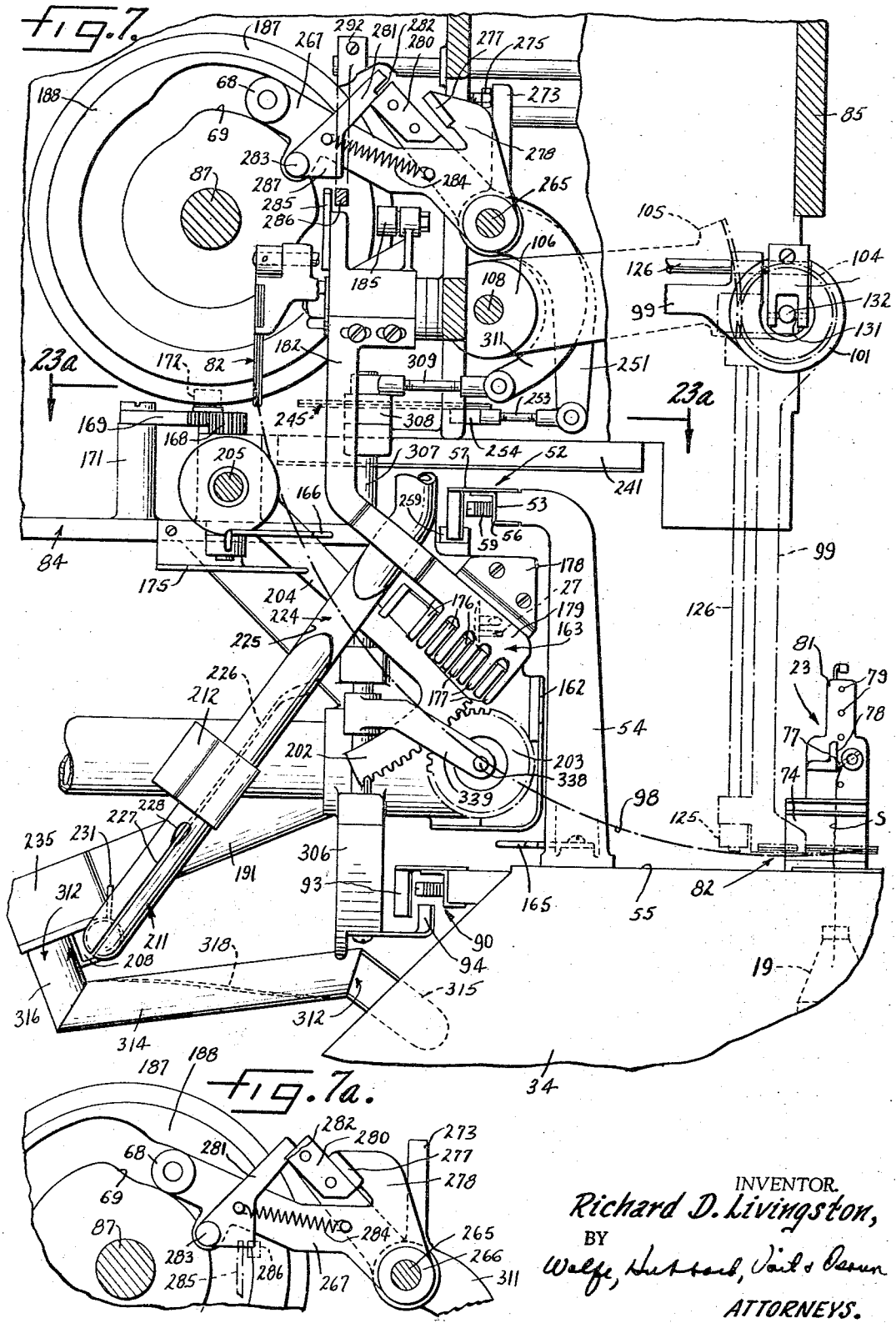

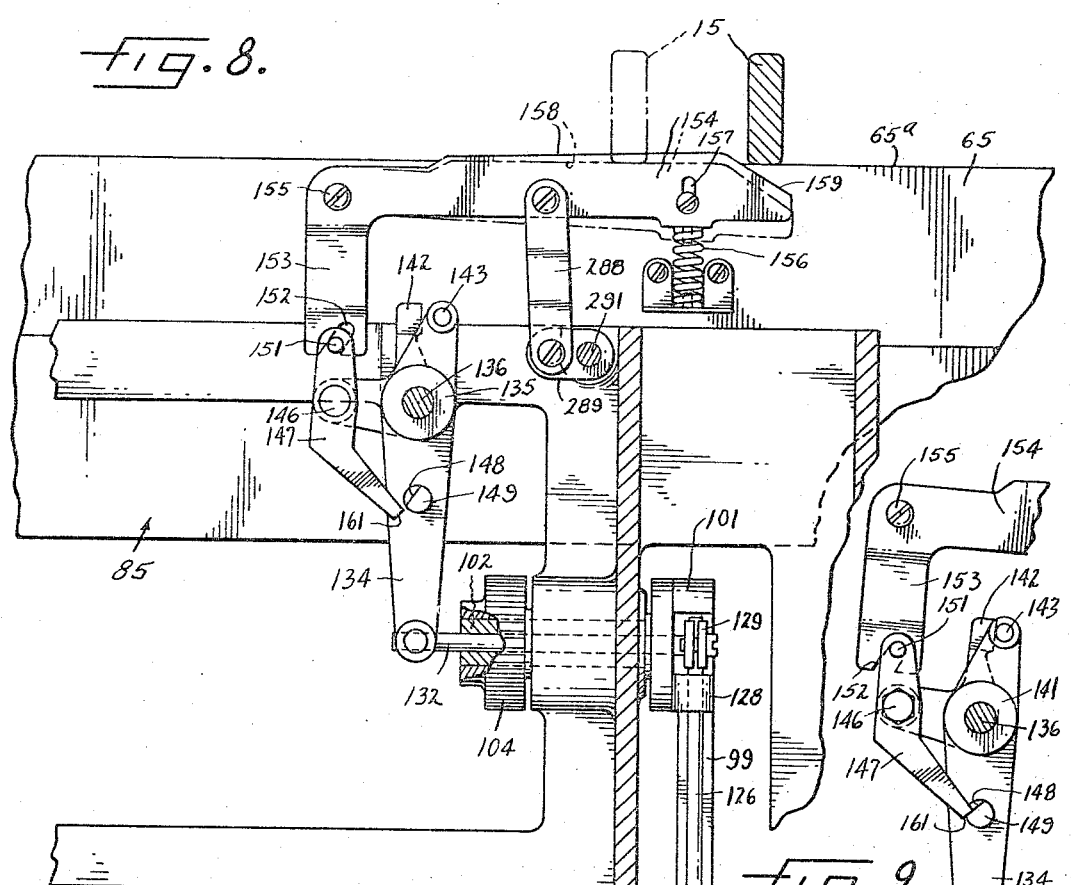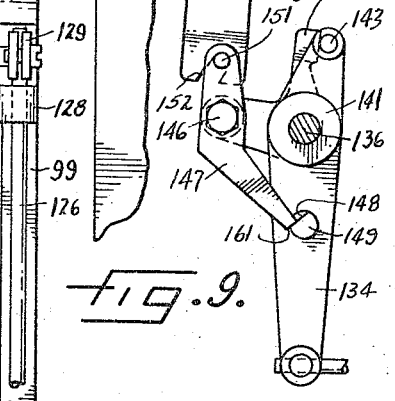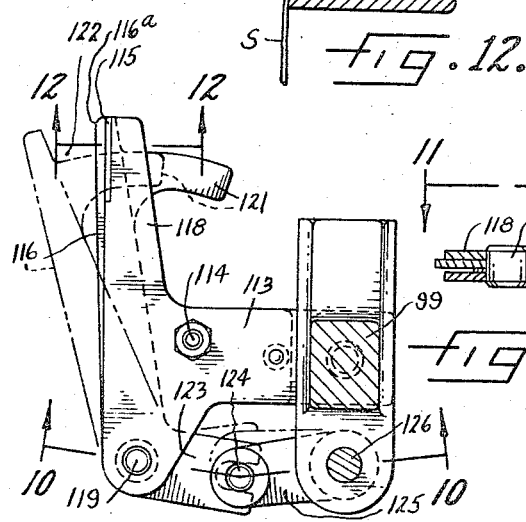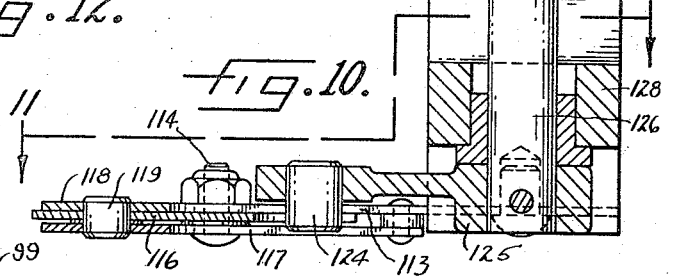

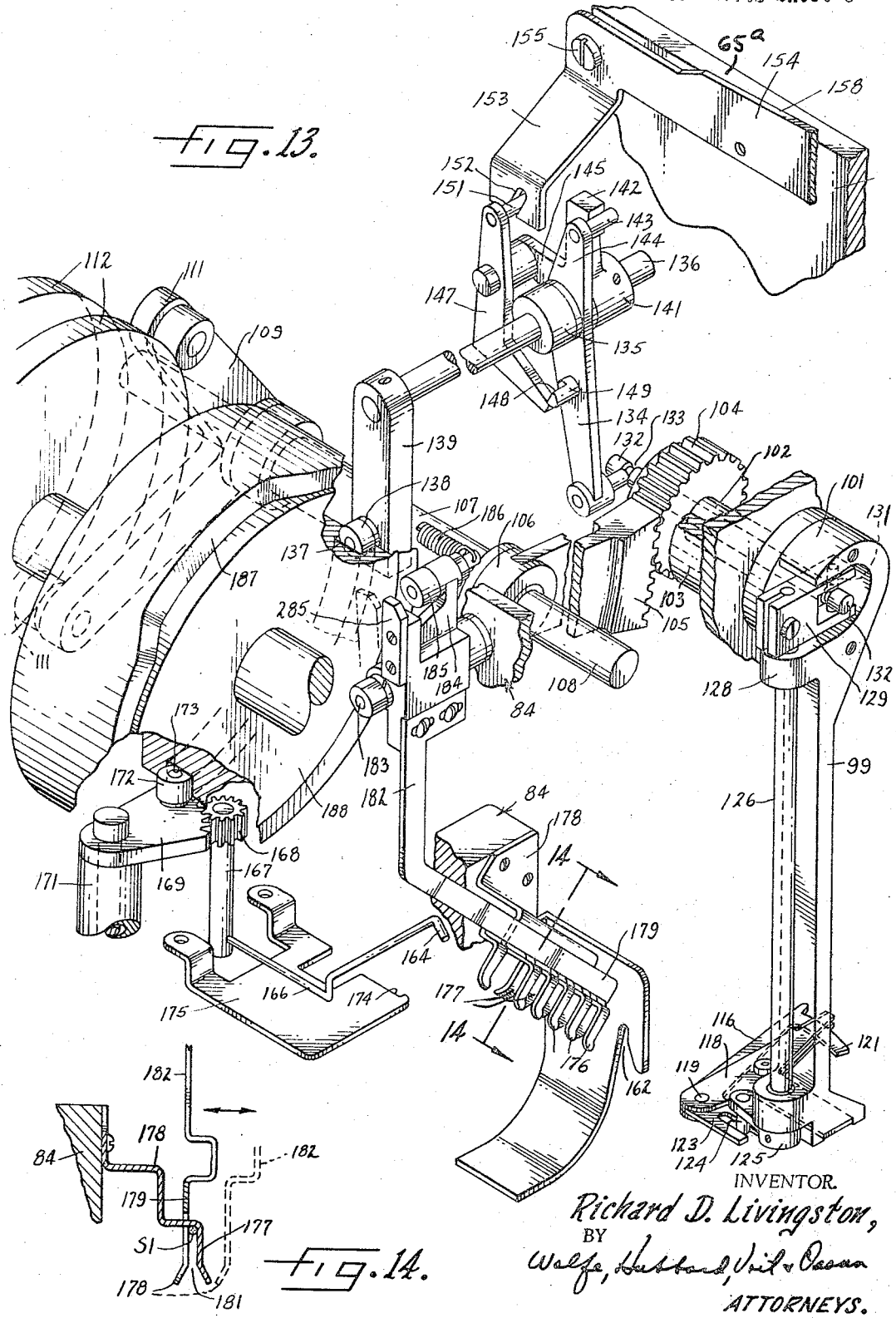

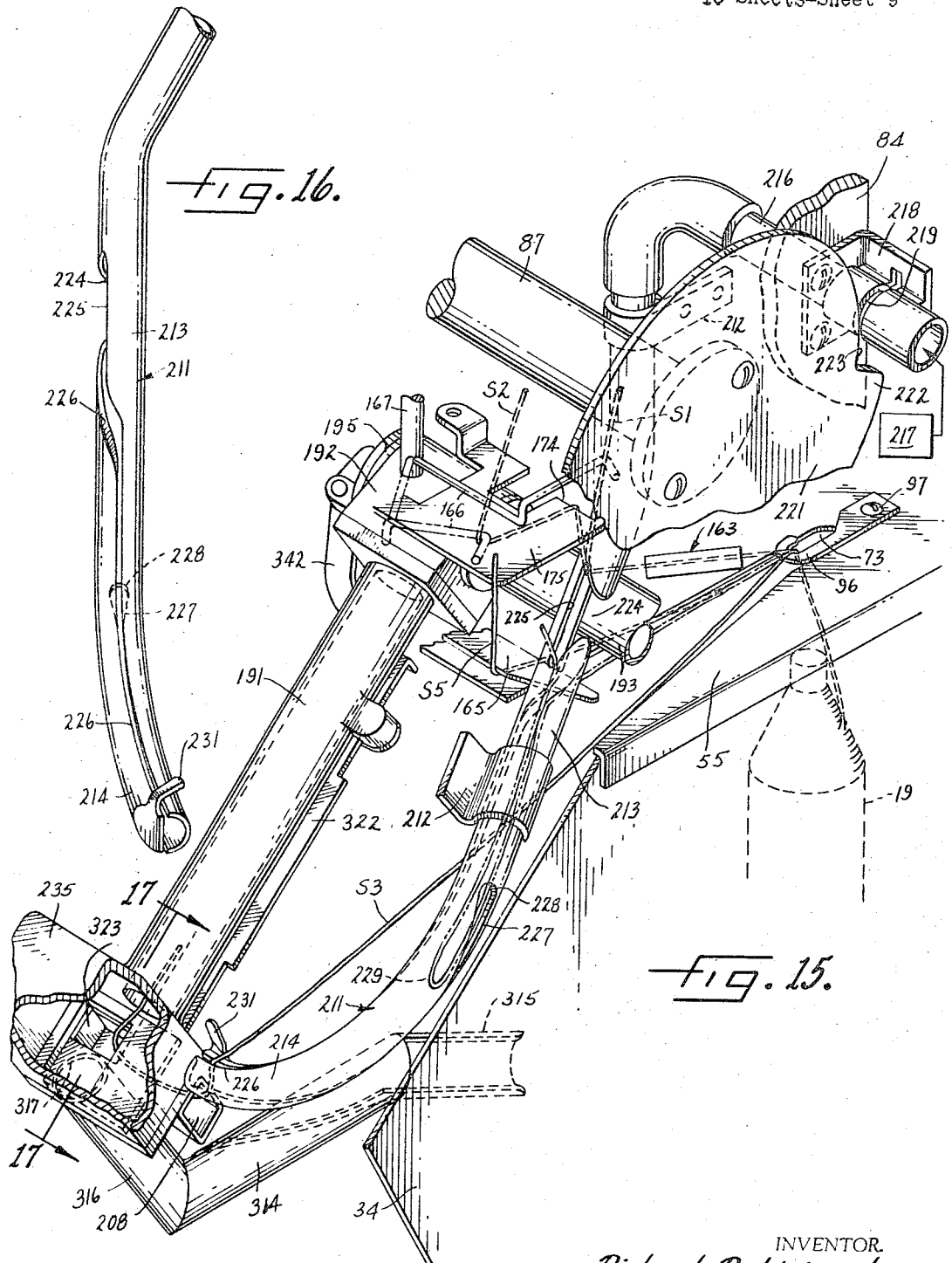

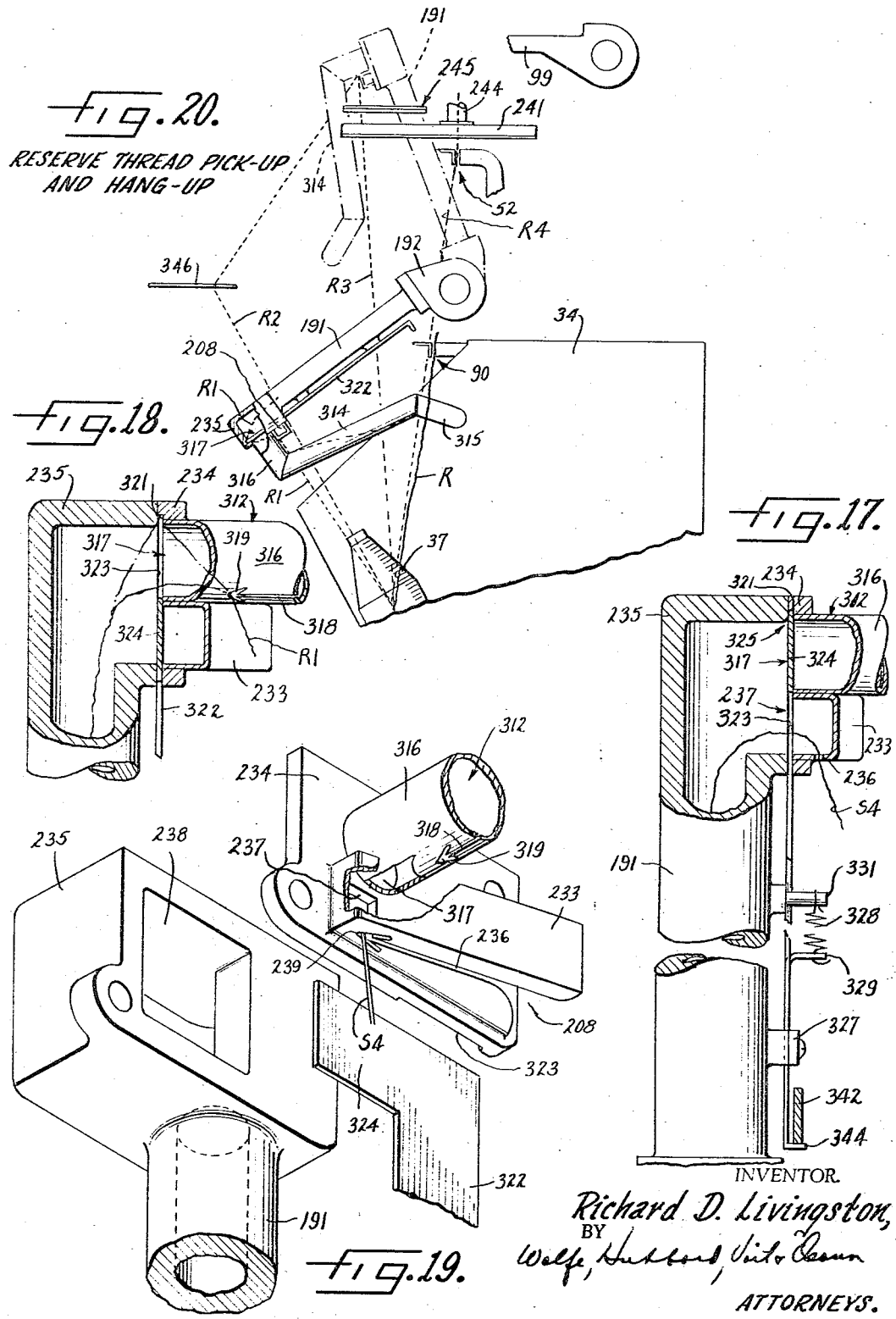

Oct. 17, 1967   R. D. LIVINGSTON   3,347,479
MULTIPLE WINDER WITH AUTOMATIC BROKEN THREAD RETRIEVAL
Filed Oct. 7, 1965   15 Sheets-Sheet 11

BROKEN THREAD
RETRIEVAL

RETRIEVED THREAD
HANG-UP

INVENTOR.
Richard D. Livingston,
BY
Wolfe, Hubbard, Voit & Osann
ATTORNEYS.

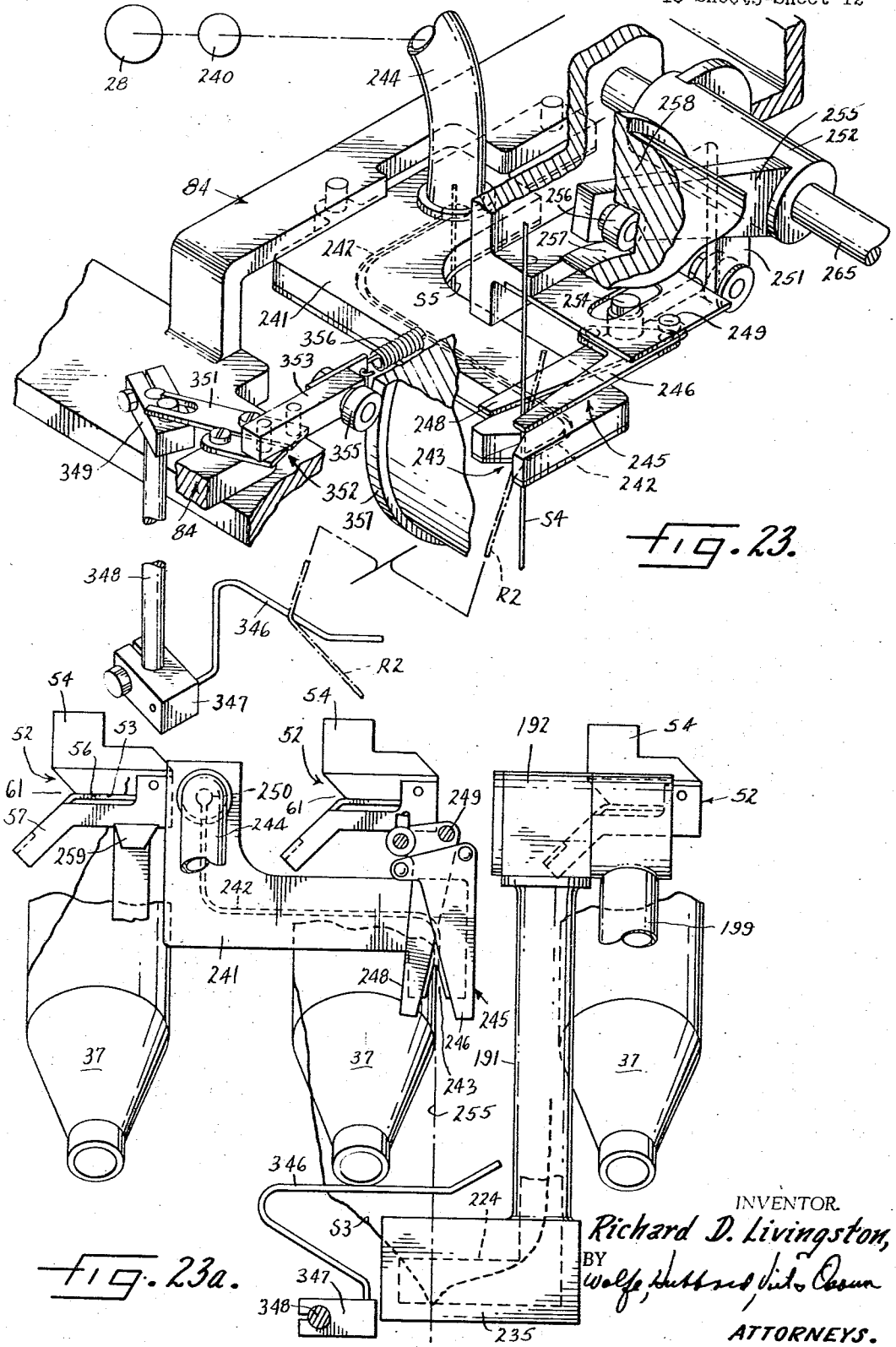

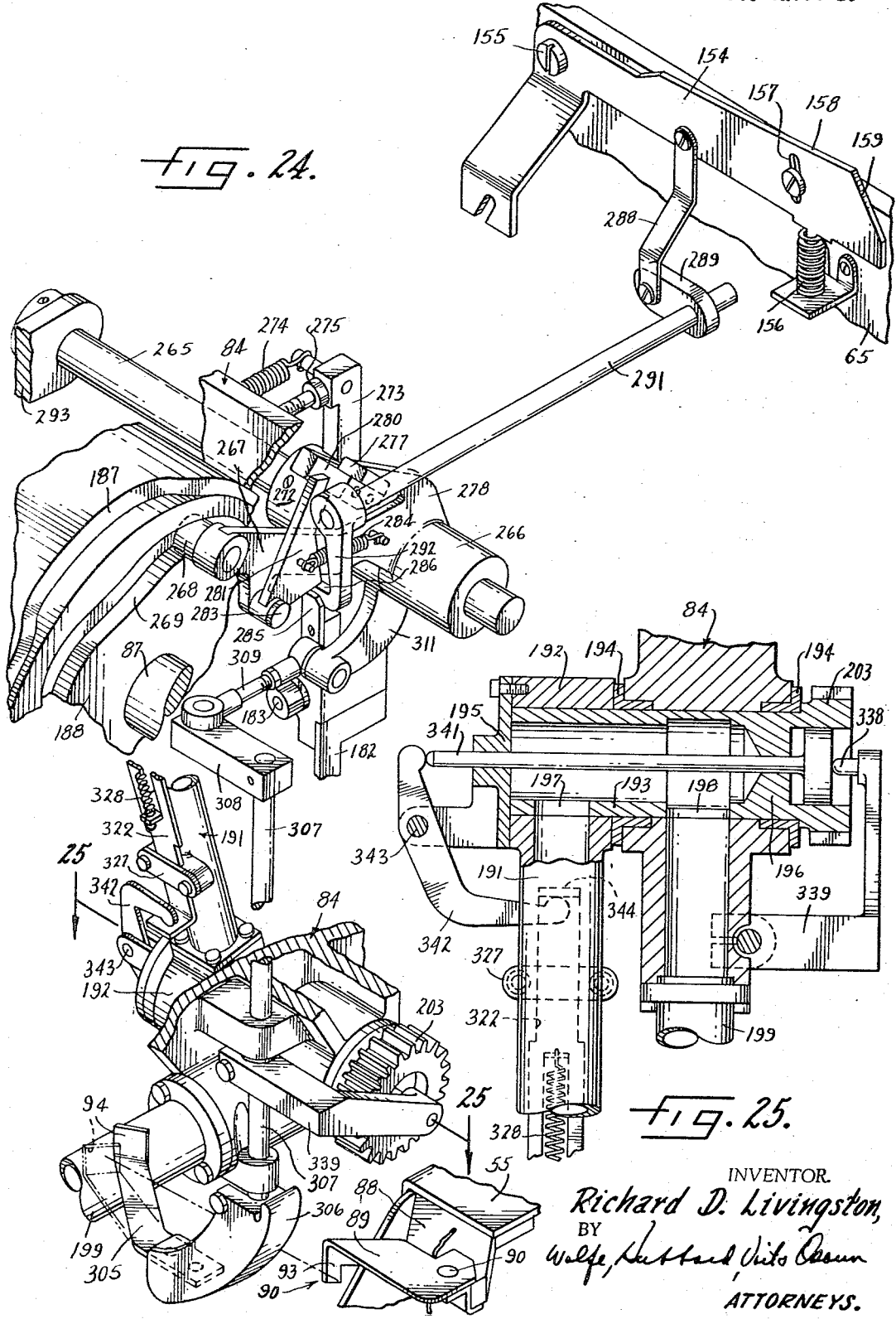

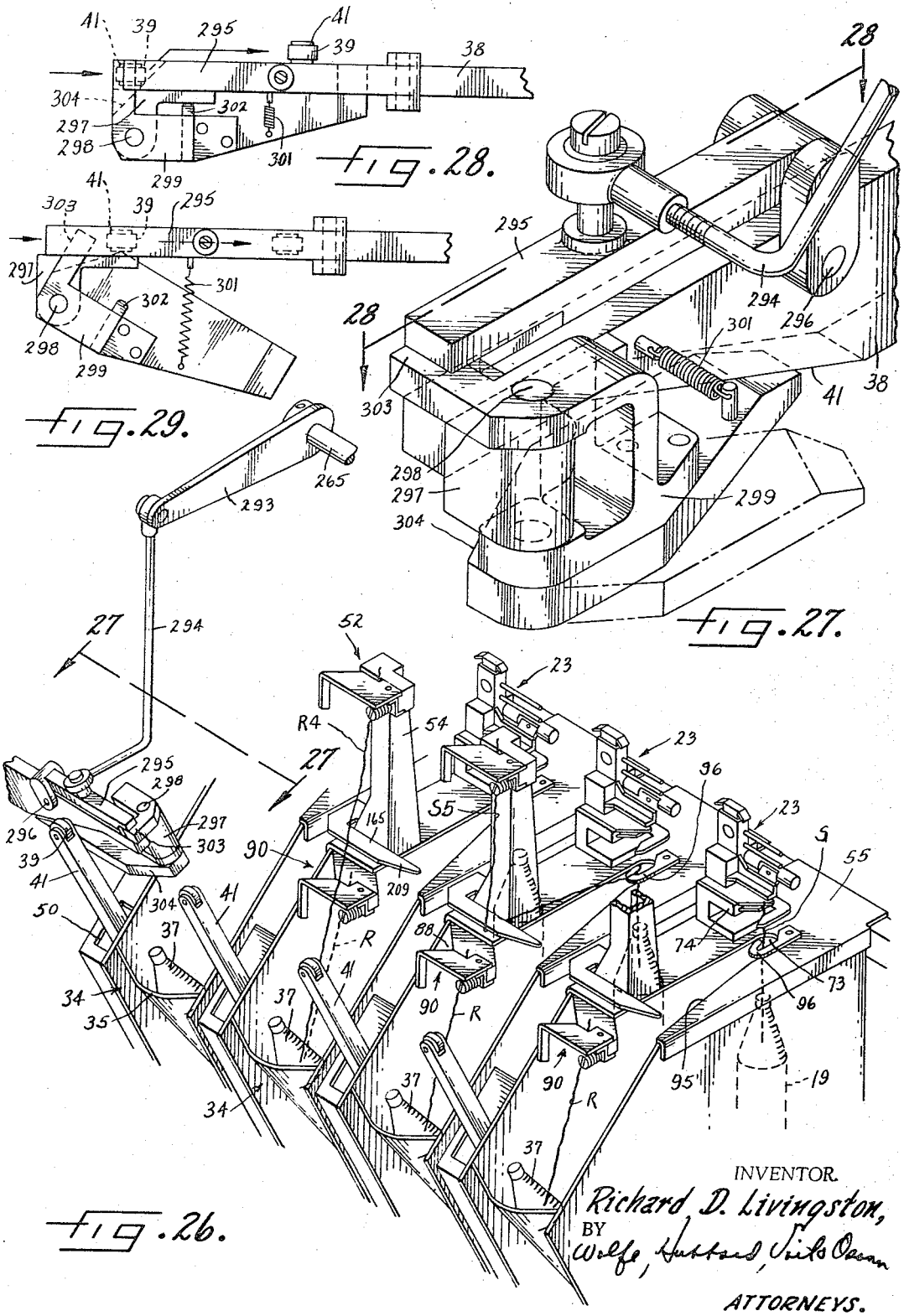

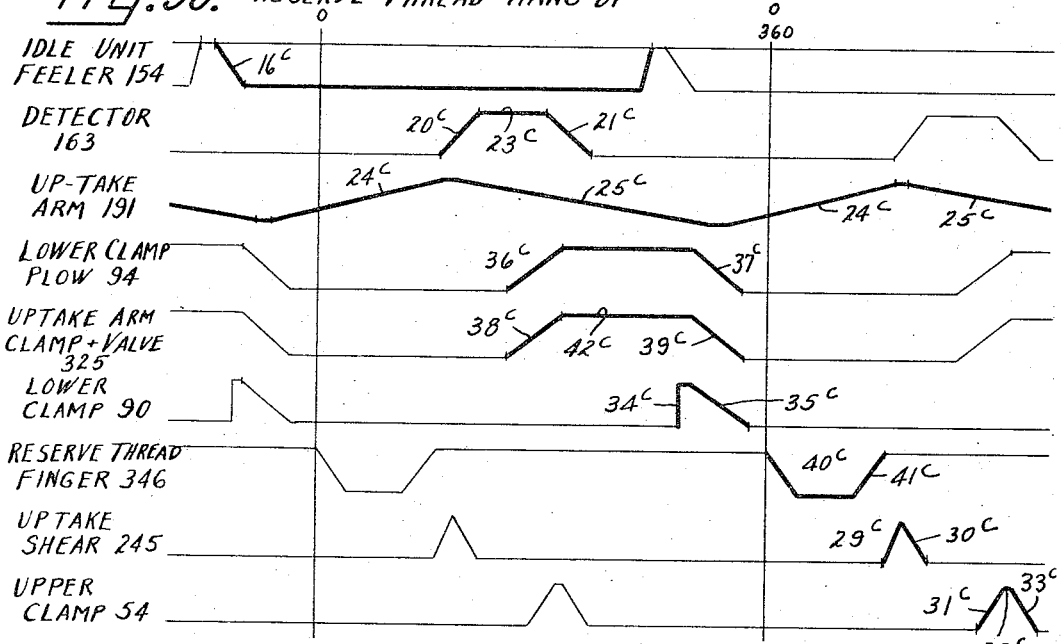
Fig. 30. RESERVE THREAD HANG-UP
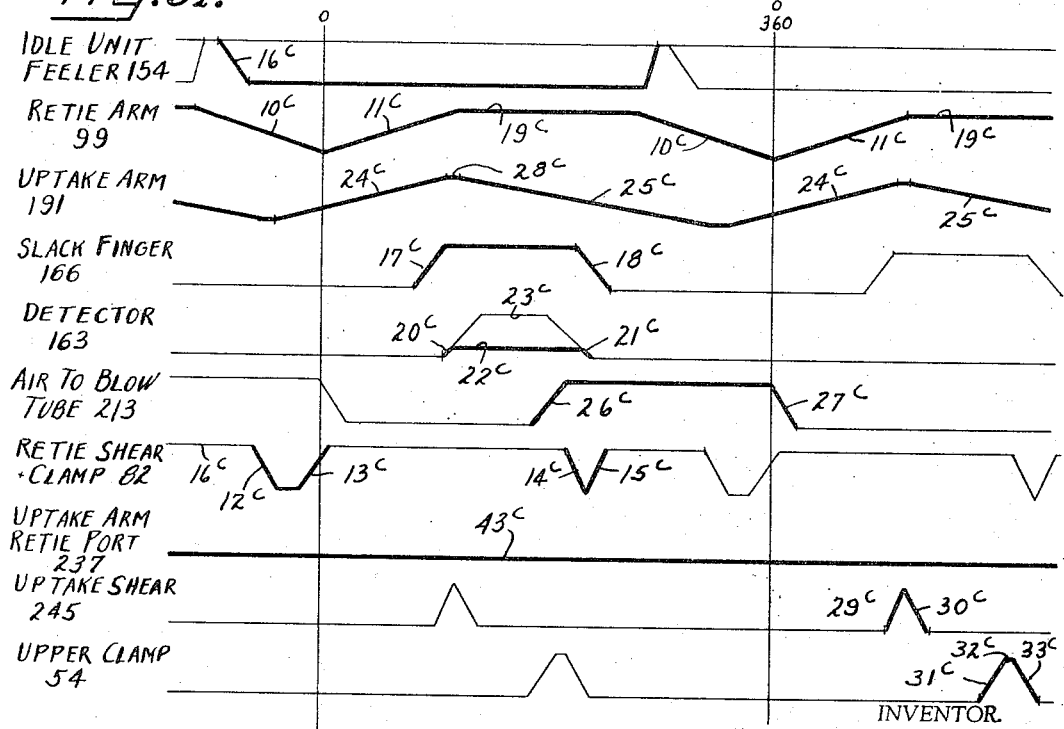
Fig. 31. BROKEN THREAD RETRIEAL + HANG-UP

United States Patent Office 3,347,479
Patented Oct. 17, 1967

3,347,479
MULTIPLE WINDER WITH AUTOMATIC
BROKEN THREAD RETRIEVAL
Richard D. Livingston, Rockford, Ill., assignor to Barber-Colman Company, Rockford, Ill., a corporation of Illinois
Filed Oct. 7, 1965, Ser. No. 493,619
43 Claims. (Cl. 242—35.5)

This invention relates to multiple unit thread winding machines of the general type disclosed in Patents Nos. 1,267,977 and 3,017,129. In such winders, reserve bobbins are loaded into upwardly opening and equidistantly spaced pockets on one support with an unwound length of each bobbin thread led upwardly to an associated gripper ready to be picked up by a servicing unit including a knotter mounted on a second support and operable to pick up and tie each reserve thread to the broken thread of a package being wound and resume the winding. The two supports are movable relative to each other along a predetermined path to bring the successive hung-up threads into operative association with the end finding and tying devices of the servicing unit.

The operator loads new supply bobbins into reserve pockets of the winding units, leads the threads thereof upwardly and into clamps preparatory to the return of the servicing unit to operate on those units which have become idled as a result of breaking the thread running upwardly from the supply bobbin to the cheese or cone being wound. Such breaking is usually induced by a yarn clearer for cleaning imperfections off from the thread. In prior winders and after such a thread break, the partially filled supply bobbin is doffed as an incident to skewering of the reserve bobbin into active winding position. The doffed bobbins are collected and later replaced in the reserve pockets for reuse in the winding units.

The primary object of the present invention is to provide a mechanism associated with the servicing or tying unit and operating automatically to retrieve as many of the available broken threads as possible, unwind thread from each idled bobbin, and hang up such thread for normal servicing while preventing skewering of the associated reserve bobbin. Generally stated, this object is achieved by feeling for a broken thread in each successive winding unit, picking up such thread if available, and, if the retrieval is successful, positioning the thread for retying onto the package by the normal action of the end finder and knotter of the servicing unit.

A second object is to provide for optimum efficiency in the retrieval of the broken thread by feeling for such threads and gripping the same at a point between the active bobbin and the thread clearer in which a broken thread usually remains held.

A third object is to cut the broken thread as an incident to the retrieval and separate it from the portion caught in the thread clearer.

A fourth object is to provide for retrieval and positioning of the broken threads during a continuous motion of the traveler past the successive winding units.

A fifth object is to support the reserve threads of a bobbin loaded into the winding units out of the path of relative movement of the servicing and winding units but, if a broken thread is not retrieved, to automatically hang up the associated reserve thread for normal engagement by the tying unit.

A more detailed object is to provide for manually hanging the reserve bobbin thread of each winding unit in a second clamp from which the thread is transferred to normal tying position in the event that the broken thread of a bobbin in active winding position is not retrieved.

A sixth object is to provide separate mechanisms for attempting the retrieval of a broken thread and the transfer of a reserve thread to tying position in each winding unit as it becomes associated with the servicing unit and to disable the reserve thread transfer in the event of successful pick-up of the broken thread.

A seventh object is to provide for sensing the successful retrieval after severance of the broken thread from the thread clearer.

The invention also resides in the novel structure for feeling for, severing, picking up, and making the broken thread of each winding unit available for rejoining to the unfilled package.

In another aspect, the invention resides in the novel manner of using a swinging arm selectively to pick up a found broken thread or alternatively a reserve thread.

Other objects and advantages of the invention will become apparent from the following detailed description taken in connection with the accompanying drawings, in which:

FIG. 7 is a fragmentary section taken along the line 7—7 of FIG. 4.

FIG. 7a shows a portion of FIG. 7 with the parts in a different position.

FIG. 8 is a fragmentary section taken along the line 8—8 of FIG. 4.

FIG. 9 shows a portion of FIG. 8 with the parts in a different position.

FIG. 10 is a fragmentary section taken along the lines 10—10 of FIG. 11.

FIG. 11 is a fragmentary section taken along the line 11—11 of FIG. 10.

FIG. 12 is a fragmentary section taken along the line 12—12 of FIG. 11 with the parts in a different position.

FIG. 13 is a fragmentary perspective view of the uptake arm and the thread detector with the parts controlling the operation.

FIG. 14 is a fragmentary section taken along the line 14—14 of FIG. 13.

FIG. 15 is a fragmentary perspective view of the mechanism for transferring a retrieved thread.

FIG. 16 is a perspective view of a portion of the blow tube shown in FIG. 15.

FIGS. 17 and 18 are fragmentary sections taken along the line 17—17 of FIG. 15.

FIG. 19 is a fragmentary exploded perspective view of the parts shown in FIG. 17.

FIGS. 20, 21 and 22 are schematic elevational views showing the different positions taken by the retrieved and reserve thread in the course of hanging the same up in the upper clamp.

FIG. 23 is a fragmentary perspective view of the mechanism for transferring the retrieved and reserve threads into the upper clamp.

FIG. 23a is a fragmentary section taken along the line 23a—23a of FIG. 7.

FIG. 24 is a fragmentary perspective view of the parts for operating the uptake arm thread clamp and the lower clamp opening plow.

FIG. 25 is a section taken along the line 25—25 of FIG. 24.

FIG. 26 is a fragmentary perspective view of the skewer control mechanism.

FIG. 27 is a fragmentary perspective view of a portion of FIG. 26.

FIGS. 28 and 29 are fragmentary views taken along the line 28—28 of FIG. 27 showing different positions of the skewer control mechanism shown in FIG. 26.

FIGS. 30 and 31 are time charts.

Figure 1:
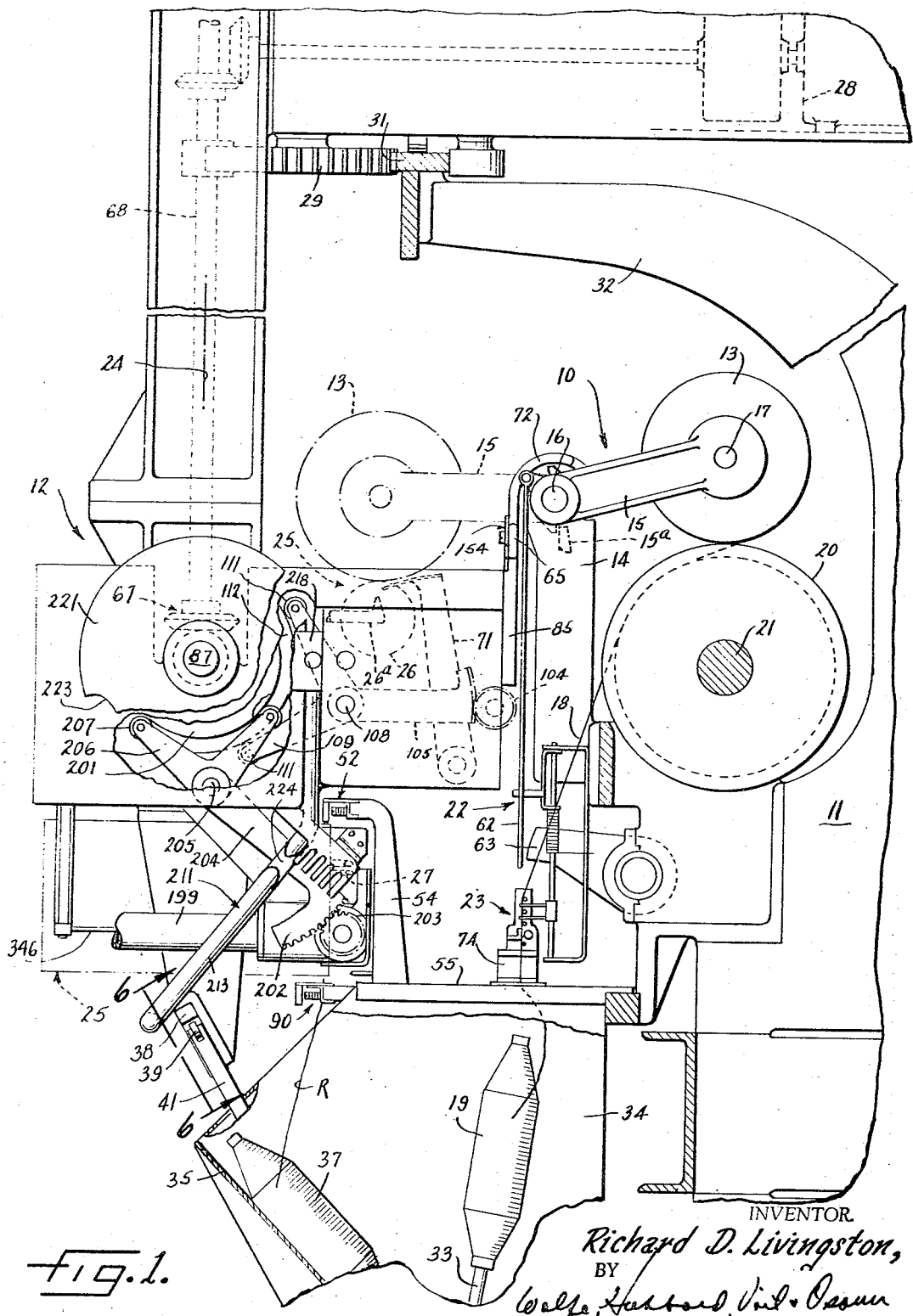
FIGURE 1 is an end view of a multiple thread winder embodying the novel features of the present invention with certain parts broken away.

While the invention in its several aspects is especially adapted for use in Barber-Colman type spoolers having a servicing and tying unit or so-called traveler movable continuously past the winding units and is shown in the drawings in a so-called Type C spooler, it is equally well adapted for use in multiple unit winding machines in which the servicing unit is relatively stationary and the winding units move past the same for servicing to resume the winding. I do not therefore intend to limit the invention by such exemplary disclosure but aim to cover all modifications and alternative constructions falling within the spirit and scope of the invention as expressed in the appended claims.

*Multiple unit thread winder—Background of present invention*

In prior multiple unit winding machines such as the Barber-Colman Type C spooler, a multiplicity of winding units 10 are arranged side by side along one side of an elongated frame 11 upstanding from a supporting floor within an endless path around which a servicing unit or so-called traveler 12 moves continuously and operates successively on idle ones of the units 10 to tie a thread onto the package 13 being wound and resume the winding. Each winding unit is mounted on an upstanding bracket 14 on the frame 11 and includes an elongated cheese arm 15 fulcrumed at 16 on the upper end of the bracket. A spindle 17 projects laterally from the opposite or free end of the arm and rotatably supports the core of the cheese or cone 13 onto which the thread 18 of a supply bobbin 19 is wound to form a package of the desired size. The winding continues so long as the supply thread remains unbroken as shown in FIG. 1 with the cheese resting on the top of a continuously rotating drum 20 carried by a shaft 21 paralleling the traveler path. The drum is grooved to traverse the thread back and forth across the cheese.

In the winding position, the cheese arm 15 projects generally horizontally and rearwardly from the pivot 16 as shown in full in FIG. 1. While being drawn upwardly, the thread passes through a break detector 22 and a thread clearer 23 by which slubs or the like are removed and which induces breakage of the thread if the imperfection is too large.

The traveler overhangs the top of the frame 11 on which it is supported and guided accurately in moving around a path in a plane 24 (FIG. 1). It carries a tying unit 25 including an end finding roll 26 and a knotter having a hook 27 and preferably is moved continuously around the path successively past the winding units 10 by power derived from a motor 28 which through suitable gearing drives a pinion 29 meshing with the teeth on an overhead rack bar 31 fixed to arms 32 upstanding from the frame 11.

Figure 5:
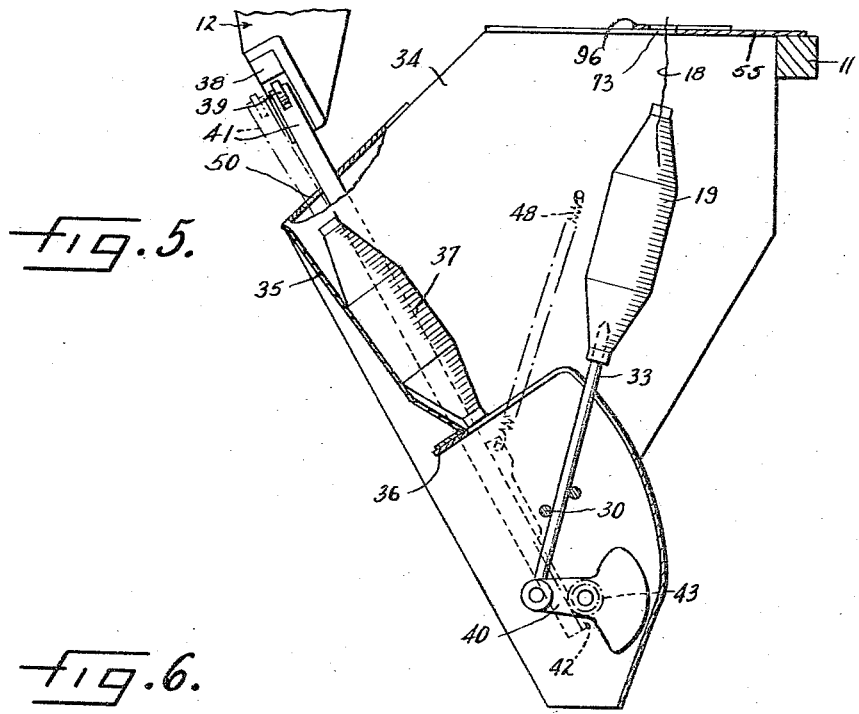
FIG. 5 is a fragmentary cross-section taken along the line 5—5 of FIG. 2.

The supply bobbins 19 for the winding units 10 are supported on skewers 33 (FIG. 5) upstanding from the bottoms of upwardly opening pockets 34 mounted on and uniformly spaced along the frame 11 below the winding drum 20 and also below the path traversed by the traveler 12. The front wall 35 of each pocket is inclined upwardly and outwardly and coacts with a downwardly sloping bottom wall 36 to support a reserve bobbin 37. The supply bobbin 19 is doffed upon retraction of the skewer which is mounted and actuated as disclosed in Patent 1,686,102.

Such retraction is effected by a plow 38 (FIGS. 5 and 6) on the traveler having an inclined leading end 44 engaging the upper end 39 of the spring loaded plunger 41 to depress the plunger which, through a rack 42 and a pinion 43 turns a crank 40 to retract the skewer far enough to release and doff the bobbin. As the plunger is later and further depressed by the surface 47, the skewer is swung about a pivot 30 and into axial alinement with the end of the reserve bobbin 37, after which the skewer 33 with the reserve bobbin attached is swung clockwise into the supply position.

The spring 48 urges the plunger inwardly about the pinion 43 against the inner end wall of a slot 50 (FIG. 5) in which the roller 39 is disposed in the plane of the plow 38. By swinging the plunger to the outer end of the slot as shown in phantom, the roller is disposed out of alinement with the plow which thus passes the winding unit without skewering the reserve bobbin.

In prior winders of type above described, the operator deposits new reserve bobbins 37 into the pockets 34 that have become empty. The operator finds the thread R, pulls the same upwardly to unwind a length sufficient to reach and be laid into a gripper in the form of a mechanically operable clamp 52 of the associated winding unit. The reserve thread thus hung up is positioned for engagement at the proper time with the tying unit 25 on the advancing traveler.

Each of the clamps comprises an outwardly facing jaw 53 paralleling the path 24 of the traveler and fixed to the upper end of a post 54 rigid with and upstanding from a top plate 55 of the pocket 34 between the supply and reserve bobbins and in the plane of rotation of the thread package 13. Coacting with the fixed jaw is a movable jaw 56 on the side of a lever 57 fulcrumed at 58 on the bracket 54 and projecting in a direction opposite to the traveler motion. A spring 59 (FIG. 7) urges the lever toward and against the fixed jaw 53. The free end portion of the lever is inclined relative to the fixed jaw and cooperates therewith to provide a throat 61 for receiving and guiding the unwound and upwardly extending length of the reserve thread into the clamp.

Figure 2:
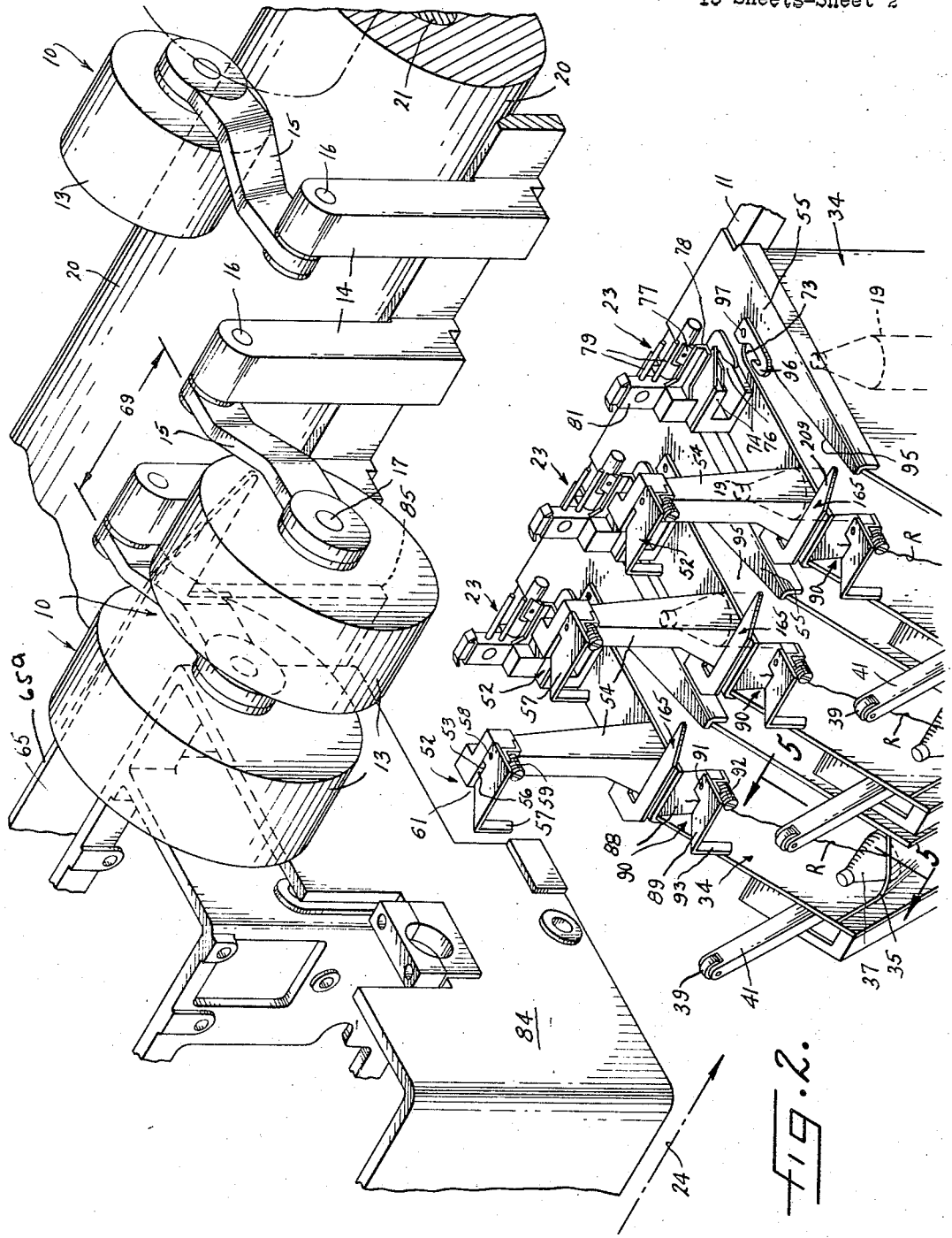
FIG. 2 is a fragmentary perspective view of a plurality of the winding units.
Figure 3:
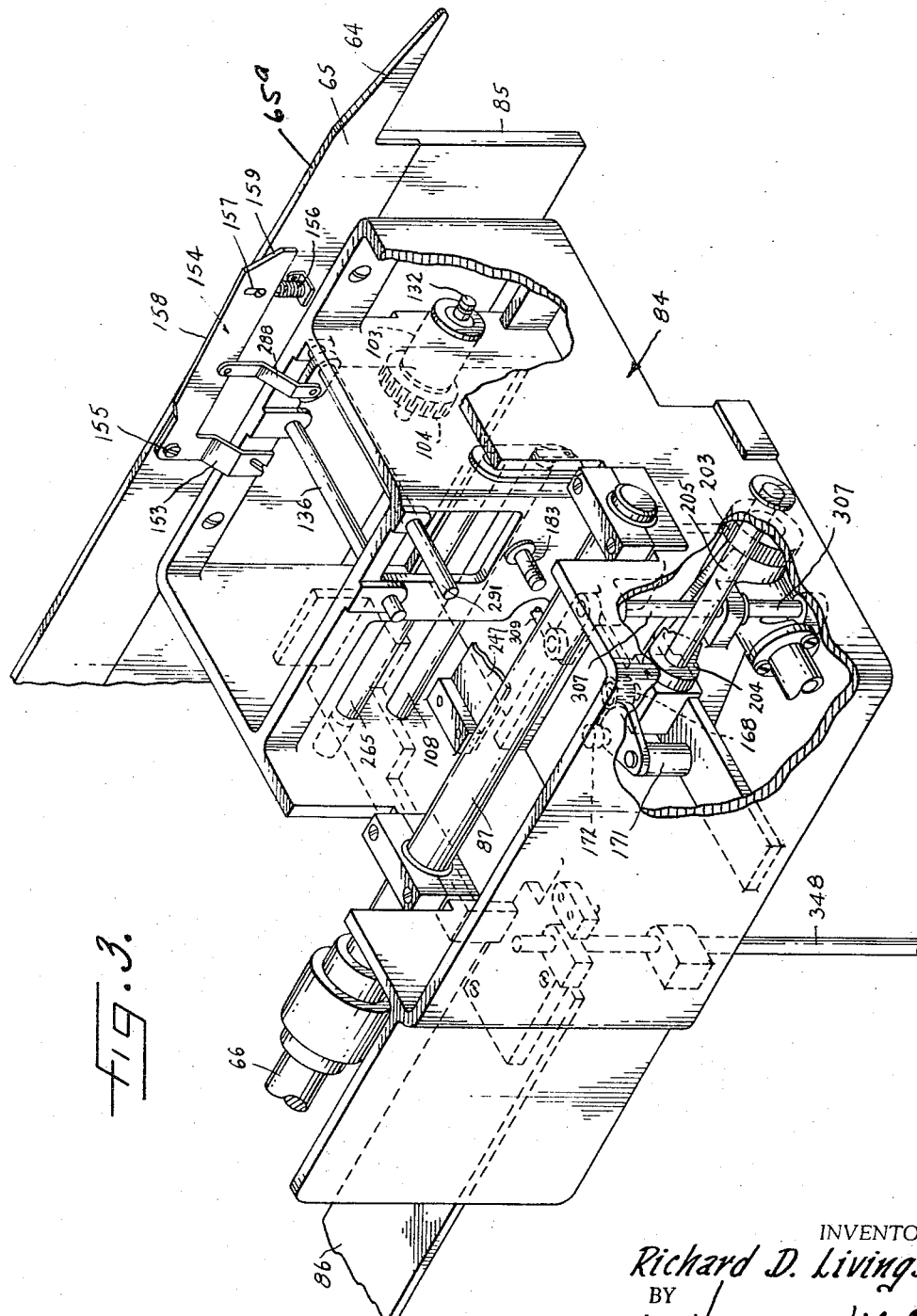
FIG. 3 is a fragmentary perspective view of the frame supporting the operating parts of the improved thread retrieving mechanism.

When the thread 18 being wound breaks or becomes exhausted, a pull wire 62 (FIG. 1) is moved by the detector 22 into the path of a constantly oscillating hook 63 which swings the cheese arm 15 upwardly from the winding position and overcenter past a vertical position from which the arm gravitates to a generally horizontal position determined by a cushioned stop 15a after which it is engaged by the inclined lead end 64 of a plow 65 (FIGS. 1, 3 and 8) secured to a plate 85 on the traveler frame. The plow end then cams the arm 15 upwardly to a generally horizontal position for accommodating the largest diameter of cheese, the arm resting on the upper surface 65a as the traveler advances. The arm is thus located in a definite horizontal position for the tying operation, this position being hereafter referred to as the idle position and shown in full in FIGS. 2 and 8 and in phantom in FIG. 1. The cheese of the winding unit thus idled is positioned for operative association with the tying unit 25 which is operated from a horizontal crankshaft 66 journaled in the traveler frame and extending along the path 24. The shaft is coupled through bevel gearing 67 (FIG. 1) with the upright shaft 68 carrying a pinion in mesh with the traveler drive gear 29 and the drive ratio is such that the shaft is turned in accurate synchronism with the traveler motion and through a cycle, one revolution in the present instance, while the traveler moves a distance equal to the pitch spacing 69 (FIG. 6) of the winding units 10.

In passing each idle winding unit, the tying unit 25 operates through means including the roll 26 and a suction device 26a and downtake arm 71 between the cheese and suction device 26a to draw a loop downward to a position adjacent a thread hung up in the clamp 52, and ties the two threads together. The cheese arm 15 is then cammed upwardly and overcenter by a plow 72 (FIG.

1) on the traveler and then is lowered by the trailing part of the plow 65 onto the driving drum 20 to resume the winding.

During the winding in each of the units 10, the thread 18 from the bobbin 19 in active winding position extends upwardly first through a guide or so-called thread eye 73 and then through the thread clearer 23 (FIGS. 1 and 2) which removes slubs and other imperfections but, in the event that the imperfection is of substantial size, induces breakage of the thread usually within the clearer thus leaving the broken end S held suspended vertically as shown at the right in FIG. 7. As disclosed more fully in Patent 2,289,980, the clearer comprises a base 74 secured to the top wall 55 of the pocket 34 above the upper end of the supply bobbin and supporting a plate 75 having an outwardly opening notch 76 above the eye 73. As the thread runs upwardly, an inclined blade 77, separated from an abutment 78 by a narrow and fixed but adjustable gap, presses the thread toward the abutment to scrape off slubs and the like. Beyond the blade, the thread is positioned and guided by staggered fingers 79, projecting cantilever fashion and horizontally from a post 81 upstanding from the base. With this arrangement, a reserve thread R, after being tied onto the unfilled cheese, moves with the traveler, is shifted backwardly in the skewering, is tensioned and traversed by the driving drum 20 and threaded automatically through the eye 73, the clearer 23 and the break detector 22 so as to run upwardly through these elements as shown in FIG. 1.

The parts above described and their operation are conventional in standard Barber-Colman spoolers and provide the environment for the present invention in its various aspects now to be described.

Invention in general

The invention takes advantage of the fact that after breakage of a running thread in a spooler as above described, the thread S of the supply bobbin is usually left suspended from the clearer 23 in a definite upright position as shown in FIG. 7. Secondly, the posts 54 supporting the hang-up clamps 52 of the adjacent winding units, although disposed outwardly from the thread clearers 23, are spaced apart along the traveler path with intervening distances sufficient to provide spaces (FIG. 2) which are wide enough to permit a properly timed pick-up device 82 (FIGS. 7, 8, 10 and 13) carried by the traveler 12 in advance of tying unit 25 to reach in between the posts, grip the broken thread S, and retrieve it for automatic retying to the partially filled cheese in the idle position thus resuming the winding off from the supply bobbin without using the reserve bobbin 37 until the supply bobbin has become exhausted. But if the cheese 13 is in winding position with a thread 18 running thereto, the pick-up device is disabled during its inward motion and prevented from cutting off or gripping the supply thread 18.

To utilize the tying unit of the traveler to effect the retying of the retrieved thread, the latter is lengthened as an incident to the retrieval and then transferred to and hung up in the regular clamp 52 so as to be positioned for proper and later engagement with the tying unit in its normal servicing action. Such handling and positioning is effected by mechanism carried by the traveler, spaced ahead of the tying unit, and acting to sense the success of each attempted retrieval and prevent later and normal functioning of the traveler in skewering and transferring the reserve bobbin 37 to the supply position. But if the retrieval is unsuccessful, the supply bobbin is doffed in the normal way and the thread R of the corresponding reserve bobbin is hung up in the clamp 52 and the bobbin is transferred by normal skewering to the supply position. The reserve thread is thus positioned for regular engagement with the oncoming tying unit.

The operating parts of the mechanism for performing the foregoing novel functions are mounted on a frame casting 84 (FIG. 3) disposed ahead of the traveler and bolted to a plate 85 constituting an extension of the traveler frame 86. Journaled in the frame 84 is an extension 87 of the traveler camshaft 66 which carries an additional eleven rotary cams for actuating parts of the new mechanisms at the times in the successive traveler cycles as shown in FIGS. 30 and 31. The motions produced by these cams and others carried by the traveler are indicated by the addition of the letter *c* found only on these figures. Those motions which produce actual motions of the parts for a single operating cycle are shown in heavy lines while the repeated idle motions are in light lines.

Reserve thread positioning

In Barber-Colman winders, the reserve bobbins may be loaded automatically into the pockets 34 with unwound lengths of their threads R exposed and held in a predetermined position by the core of the bobbin as disclosed in my copending application Ser. No. 463,575, filed June 14, 1965, or, as in the present instance, the bobbins may be dropped manually into the pockets and unwound lengths of their threads R hung up temporarily in auxiliary clamps 90 disposed below the upper clamps 52 and the path of the tying unit 25 and thus adapted to be by-passed in the event of a successful retrieval of the broken threads of a supply bobbin 19. Herein, each auxiliary clamp is spaced outwardly from and substantially below the upper clamp 52 and is of substantially the same construction including a jaw 88 (FIGS. 2 and 24) formed by a flange depending from the outer end of the top wall 55 of the reserve pocket and coacting with a movable jaw on the side of a lever 89 fulcrumed at 91 on the fixed jaw. A spring 92 urges the lever toward and against the fixed jaw. The free end portion of the movable jaw is inclined relative to the fixed jaw and cooperates therewith to provide a V-shaped throat for receiving and guiding the unwound length of the reserve thread R into the clamp. The normally closed clamp is opened by the engagement with a depending lug 93 (FIG. 24) on the movable jaw with a plow 94 movably mounted on the frame 84 as this plow passes the clamp and opens and closes the latter.

Modified thread eye

The retrieval and hang-up of the broken supply thread S as contemplated by the present invention involves the unwinding of some additional thread which in turn requires that the thread be retained in the thread eye 73 while the thread, after being gripped, is being pulled outwardly through the spaces between the clamp supporting posts 54. This involves a modification of the thread eye which heretofore has been an enlargement at the apex of an outwardly opening V-shaped notch 95 in the top wall 55 of each pocket 34.

The modification includes a J-shaped hook 96 (FIG. 2) clamped at 97 to the top wall 55 and projecting outwardly along one side of the eye 73 and then curving laterally and then reversely partially across the notch 95 near the eye. Thus, a reserve thread is allowed to move along the notch past the free end of the hook and enter the eye while at the same time trapping the broken thread S and preventing its escape during the unwinding and outward drawing of this thread for effecting its retrieval and hang-up in the upper clamp 52.

Broken thread retrieval

The pick-up device 82 is mounted on the traveler frame 84 for movement inwardly and transversely of the traveler path just as it passes the clamp supporting post 54 of each winding unit 19 and always feels for and tries to retrieve a broken thread S extending between the supply bobbin 19 and the thread clearer 23 (see FIG. 7). While the feeling and pick-up motion may be substantially rectilinear as by supporting the device through a parallelogram linkage, the movement in the present instance is along an arcuate path 98 (FIGS. 7 and 21) between the limit lower pick-up position (FIGS. 7 and 13) and the upper retracted position outwardly from the clamp supporting posts 54 as shown in phantom in FIG. 21.

Herein the pick-up device is mounted on the free end of an arm 99, hereafter called the retie arm, swingable relative to and in a plane perpendicular to the traveler path 24. A hub 101 (FIGS. 7 and 13) of the arm is fast on one end of a sleeve 102 journaled in a bearing 103 in the casting 84 and carrying at its other end a gear 104 meshing with teeth on the free end of the segment 105 whose hub 106 is fixed to one end of a sleeve 107. The latter is loose on and supported by a fixed shaft 108 supported in webs of the casting 84. The opposite end of the sleeve carries a V-shaped follower 109 with angularlly spaced rollers 111 engaging the peripheries of axially spaced cams 112 fixed to the main camshaft 87 and acting in each camshaft revolution to move the arm positively in opposite directions first downwardly at 10c to the vertical pick-up position (FIGS. 7 and 13) and then outwardly and upwardly at 11c to the retracted horizontal position shown in phantom in FIG. 21.

*Pick-up of broken thread.*—Retrieval of the broken supply thread S may be effected simply by clamping the thread securely below the clearer 23 and drawing the same outwardly, it is preferred not only to clamp the thread but also to sever the same thus leaving a length in the clearer for later disposal by the usual suction means. Herein, the device 82 (FIGS. 7, 10–13) projects laterally from and substantially perpendicular to the free end of the retie arm 99 in a direction opposite to the traveler motion and includes a generally L-shaped plate 113, one leg of which is seated in a slot in the end of the arm and bolted thereto at 114. A cutting edge 115 formed on the other leg 118 coacts with the edge 116a of a movable jaw 116 to form a shear, the movable jaw being disposed between the leg 118 and a jaw 117 on a bell-crank similar in L-shape to the plate and secured to the latter by a pivot pin 119 with sufficient clearance to allow a thread S severed by the edges 115 to become wedged between the jaws and held securely as shown in FIG. 12. A finger 121 (FIG. 11) projects laterally from the jaw 116 past and below the edge 115 and cooperates with the arm end 116a to form a relatively wide notch 122 for receiving the broken thread as held suspended from the thread clearer 23.

*Selective actuation of shear and clamp* (FIGS. 8 and 13).—The other leg 123 of the jaw 116 is coupled through a pin and slot connection 124 with the free end of a crank 125 fixed to the end of a rockshaft 126 extending along the retie arm 99 and journaled in bearings 128 (FIG. 13) spaced therealong. Adjacent the inner end of the arm, a crank 129 fixed to the rockshaft is coupled by a pivot pin 131 to one end of a rod 132 extending axially through and slidable in the sleeve 102. At the opposite end, the rod is pivotally connected at 133 to a pin projecting from the one end of a lever 134 having a hub 135 intermediate its ends and loose on a rockshaft 136 extending transversely of the camshaft. The shaft is supported in bearings on the frame 84 and adapted to be actuated selectively to open and then close the thread cut-off and clamping device 82 at the proper times only if the winding unit 10 being approached by the traveler is idle as evidenced by the cheese arm 15 thereof being in the idle position and projecting outwardly as shown in phantom in FIG. 1. But if the unit is active in winding thread onto the cheese, the clamp actuating arm 134 remains disconnected from its actuator so that the pick-up device 82 with the clamp thereof closed merely makes an idle motion into and out of the space beyond the post 54 of the winding unit, the jaws 116 and 118 moving idly past the thread 18 running from the supply bobbin to the cheese.

Actuation of the pick-up device 82 to open and close the clamp 116–118 is effected positively by a barrel type cam 137 (FIG. 13) on the shaft 87 having a follower in the form of a roller 138 riding in the cam groove and projecting laterally from the free end of a crank arm 139 fast on the end of the shaft 136 and oscillated back and forth at 12c and 13c in each revolution of the camshaft to open and close the clamp in an attempt to pick-up and retie a broken thread S and later at 14c and 15c to release the retrieved thread.

Fixed to the shaft 136 is the hub 141 of a bell-crank having an upstanding arm 142 adapted for abutting engagement with a pin 143 projecting laterally from an arm 144 upstanding from the hub 135 of the lever 134. A horizontally projecting arm 145 on the bell-crank pivotally supports at 146 the medial portion of a detent lever 147 whose inclined lower end is adapted to swing out of and into alinement (see FIGS. 8 and 9) with a flat 148 on a pin 149 projecting laterally from the lever 134 below the shaft 136 and fulcrum thereof.

Projecting from the other end of the detent lever is a pin 151 disposed in an arcuate slot 152 in the depending arm 153 of a bell-crank 154 fulcrumed at 155 on the plow 65 of the traveler and constituting a feeler for sensing the idle position of the cheese arms 15 so as to indicate, according to its vertical position, whether the winding unit 19 being approached is idle or running properly. The slot is long enough to accommodate the continuous up and down motion of the bell-crank arm 147 by the cam 137. The other bell-crank arm 154 projects horizontally from the pivot 155 along the plow 65 in the direction of the traveler motion and is urged upwardly by a compression spring 156 to a position (FIG. 8) determined by a pin and slot connection 157 between the lever and the plate. In this position, the straight upper edge 158 of the lever arm is disposed somewhat above the undersides of the cheese arms 15 of those winding units which are idle, such arms then resting on the upper edge of the plow 65 shown in FIG. 8. The length of the surface 158 along the traveler path is somewhat shorter than the spacing of the cheese arms of adjacent winding units and, at its forward end, merges with an incline 159 adapted for engagement with and beneath the cheese arm of each idle winding unit.

The bell-crank 154 thus constitutes a feeler for sensing the idle condition of each winding unit as evidenced by downward camming of the feeler arm as its forward end 159 comes into engagement with and passes an idle cheese arm 15. The resulting counter-clockwise downward rocking of the feeler moves the end 161 of the detent lever from the position shown in FIG. 8 into alinement with flat 148 as shown in FIG. 9, the detent thus coupling the cam oscillated bell-crank 147 positively to the lever 134. Thus, while the detent end 161 remains out of alinement with the flat 148 (FIG. 8) during its back and forth movement in each camshaft revolution, the detent oscillates idly with the bell-crank 147 as the arm thereof moves toward and away from the pin 149 on the lever 134. Then, when the feeler lever 154 is depressed by a cheese arm 15 as shown in phantom in FIG. 8, the detent end is swung into alignment with a flat 148, this occurring when the arm 142 is engaging the pin 143. The lever 134 and the bell-crank 145 are thus locked together so that in the next clockwise and counter-clockwise strokes of the bell-crank 141 the shear and clamp are open at 12c and closed at 13c, the clamp when closed as shown in FIG. 13 gripping the broken thread S as shown in FIG. 12.

The pick-up clamp remains closed at 16c until the arm 99 has moved past the post 54 supporting the upper thread clamp 52 and the pick-up device 82 is approaching the lower and pick-up position. At this time 12c, the arm 134 (FIG. 9) is rocked counter-clockwise with the detent 147 and bell-crank 141 thus opening the clamp as shown in phantom in FIG. 11 to form the notch 122 for receiving the broken thread S. Substantially immediately and at 13c as the bell-crank 134 is rocked reversely, the shear and clamp are closed on the thread thus severing the same at a point just below the thread clearer 23 while gripping and retaining the bobbin thread end as shown in FIG. 12. Then, as the retie arm 99 is swung outwardly and upwardly out of the space between the posts 54 of adjacent winding units, the pick-up device 82 traverses the arcuate path 98 to the upper position shown in phantom in FIG. 21 and in full in FIG. 7 thus drawing additional thread off from the supply bobbin 19 through the eye 73 and the hook 96 cooperating therewith.

Positioning retrieved thread

Figure 4:
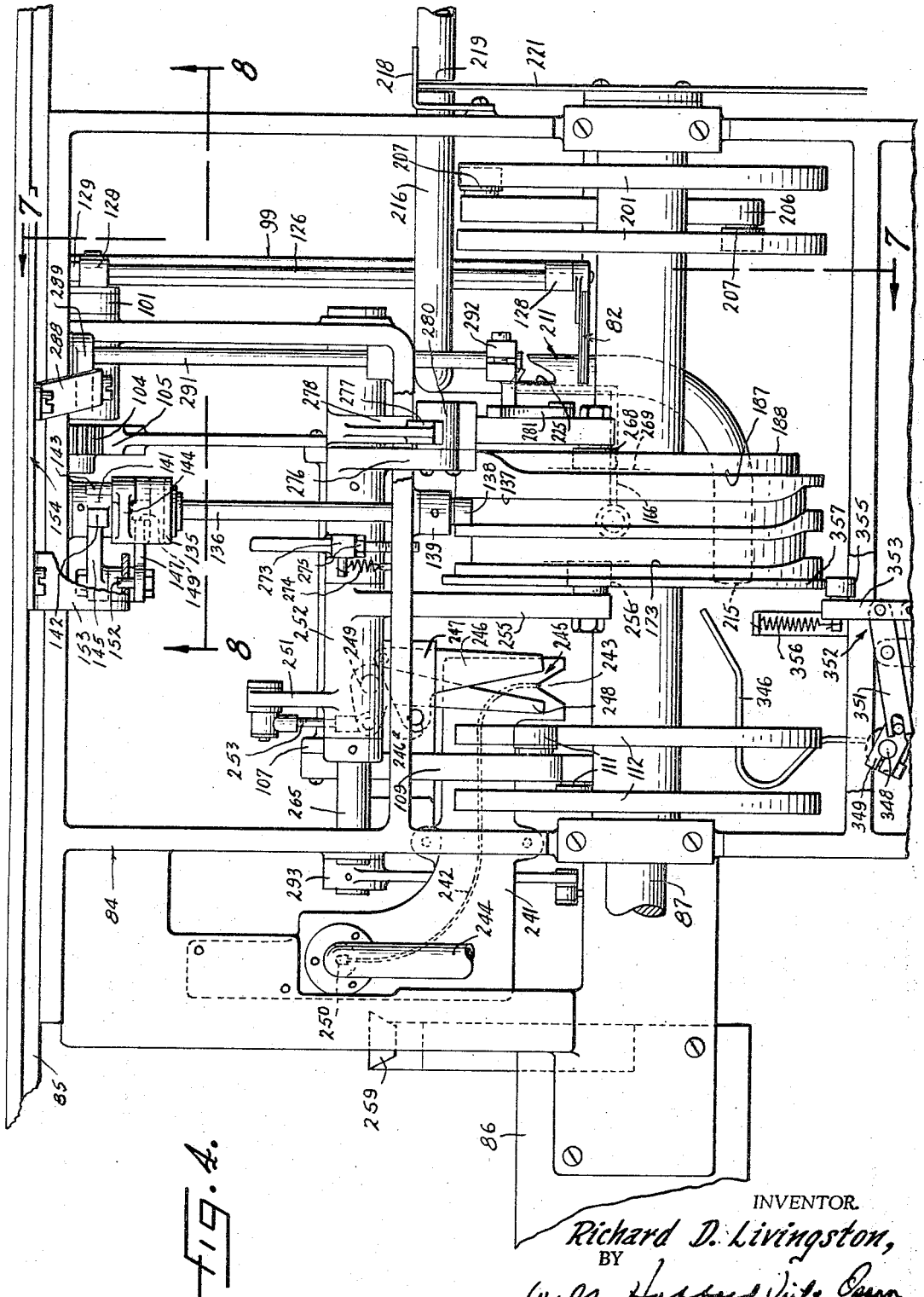
FIG. 4 is a plan view of a portion of FIG. 1 showing the parts embodying the present improvement.

In the outward movement of the pick-up device indicated at 11c along the path 98, the retrieved thread is drawn upwardly and outwardly through the eye 73 and the hook 96 and then through a downwardly opening V-shaped guide notch 162 (FIG. 13) on the traveler casting 84, a presence-of-thread detector 163 and around a hook 164 operable from the camshaft 87 to draw additional thread from the supply bobbin. At the end of the outward and upward swinging of the retie arm 99, the broken thread is positioned as shown at S1 (FIG. 21) with the thread as unwound from the supply bobbin 19 during the retrieval motion extending from the eye 73 first outwardly and through the notch 162 above a guide finger 165 (FIGS. 2, 15 and 21) later to be described which notch controls the laying of the thread in the detector 163 which is activated to determine the success or failure of the retrieval. Above the detector, the thread extends upwardly and around the hook 164 then in its innermost position (FIGS. 13 and 16) until the pick-up device 82 reaches its upper position shown in phantom in FIG. 21 and in full in FIG. 4.

The hook 164 is on the free end of a right angular arm 166 projecting laterally from an upright rockshaft 167 journaled in the traveling frame 84 and carrying a pinion 168 which meshes with the teeth of a gear segment 169 pivoted on a post 171 and carrying the follower 172 of a barrel type cam 173 (FIGS. 4 and 13) fast on the main shaft 87 and operating to swing the arm 166 and its hook 164 outwardly and inwardly at 17c and 18c. In its outward movement, the arm draws additional thread off from the bobbin 19 and lays the thread over the top and in a notch 174 of a guide 175 (FIGS. 13 and 15) fixed to the frame 84. The upper position of the retrieved thread is thus moved from position S1 (FIG. 21) to S2 as the retie arm 99 reaches its upper position at 19c.

Detecting successful retrieval of broken thread

While the detector may take various forms and operate in various ways including photo-electrically, a mechanical feeler is employed in the present instance comprising fixed and movable jaws 176 and 177 (FIGS. 7, 13 and 14) which lie along the path of retrieval of the broken thread S1 which is laid between the jaws in the outward movement of the retie arm. The jaws are adapted to be blocked (FIG. 14) by the retrieved thread S1 but to pass by each other in the absence of such a thread, the jaws 177 then moving past the fixed jaws to the position shown in phantom in FIG. 14. The jaw 177 is permitted to move at the proper time toward the fixed jaw to become blocked by the thread as shown in FIG. 14 if the retrieval of a broken thread has been successful, but to move past the jaws 176 if the attempted retrieval has been unsuccessful or if the winding unit is operating and there is a thread 18 running to the cheese (FIG. 1) so that the clamp of the pick-up device 82 is not opened during movement of the device 82 to the pick-up position.

The fixed jaw 176 comprises laterally spaced fingers projecting from a plate 178 secured to the casting 84 while the movable jaw has similar fingers projecting from a plate on the end of an arm 179 and closely staggered relative to the fixed fingers so as to be movable past the latter in the absence of a thread as shown in phantom in FIG. 14. The free ends of the fingers diverge away from each other and, in retracted position, define a throat 181 disposed in the plane of the guide 162 for receiving the thread. The movable fingers are on a downwardly inclined end portion of an upright lever 182 which is fulcrumed intermediate its ends on a pivot pin 183 supported by the casting 84.

Projecting upwardly from the pivot is an arm 184 carrying a follower roller 185 which is urged by a contractile spring 186 against the axially facing surface 187 on a cam 188 which controls the permissive movements 20c and 21c of the movable jaw 177. When the retie arm moves outwardly and upwardly at 11c, the jaw 177 is disposed as shown in full in FIG. 14, the retrieved thread S1 being laid in between the jaws as shown in full in FIG. 14. Then, as the movable jaw 177 is released by the cam 188 to the action of the spring 186, the jaw is blocked at 22c as shown in full in FIG. 14 if a retrieved thread has been laid in the detector. But, in the absence of such a thread, either due to the properly running condition of the winding unit or due to an unsuccessful attempt to retrieve a broken thread, the jaw 177 will be moved on past the fixed jaw 176 to the position 23c as shown in phantom in FIG. 14 thus setting the stage for transferring the corresponding reserve thread from the lower clamp 90 to the upper clamp before the tying unit 25 arrives to effect resumption of the winding by the unit. Such transfer is prevented however as later described if the winding unit being approached for servicing by the traveler is running properly as evidenced by its cheese arm 15 being disposed out of the idle position.

It will be apparent that the detector 163 operates automatically to sense at the proper time the presence of a retrieved thread in a position and determine, according to the position of its supporting lever 182 after the time of attempted retrieval of a broken thread, whether such a thread is available for hanging up in the upper clamp 52 and therefore whether the reserve bobbin 37 should be skewered into the supply position and its thread R transferred from the lower clamp 90 to the upper clamp 52 preparatory to arrival of the tying unit 25 of the traveler to perform its regular servicing operations on the thread then hung up in the clamp.

Positioning retrieved thread and transfer to uptake arm

A broken thread of a supply bobbin, after successful retrieval and disposed in the position S2 as above described is transferred to and hung up in the upper clamp 52. This may be accomplished in various ways as by a mechanism operating independently of that by which the reserve thread R is transferred from the lower clamp 90 to the upper clamp 52. In the present instance, the retrieved and reserve threads are picked up by separate devices which are suction operated and are mounted on a common support 191, hereafter called the uptake arm indicated by and carried thereby to the upper clamp 52. After the pick-up of each thread, the latter is drawn upwardly, positioned, and transferred to the clamp 52 by means which is of the same general construction and operates in the same way as that forming the subject matter of my copending application Ser. No. 463,575, filed June 14, 1965.

Figure 22:
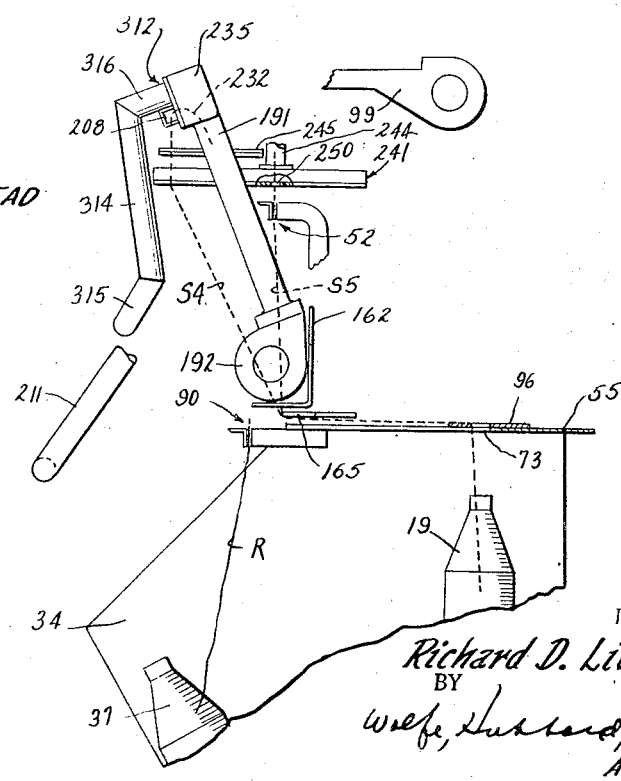

The arm 191 is an elongated suction tube mounted in bearings 194 (FIG. 25) to swing back and forth transversely of the traveler path in each camshaft revolution during which the freed end portion of the thread is grasped in the lower position (FIGS. 7 and 15) of the arm and carried up to the clamp 52 as the arm swings up to the position shown in FIGS. 22 and 24. Formed on the fulcrumed end of the arm is a hollow hub 192 which is fixed to one end of a sleeve 193 journaled at the opposite end and axially fixed in a bearing 194 on the casting 84 (FIGS. 24 and 25). The sleeve is closed by end walls 195 and 196 and communicates with the tube 191 through a passage 197 and an arcuate slot 198 with the end of a pipe 199 extending into and through the sleeve 193 and communicating in all angular positions of the arm with a suitable vacuum source which may be a suitable pump provided on the traveler and utilized in the Type C spooler in the end finding and tying operations.

Swinging of the suction arm back and forth is effected herein by cams 201 (FIGS. 1 and 4) on the shaft 87 acting through a segmental gear 202 meshing with a pinion 203 (FIGS. 1, 7, 24 and 25) on the end of the sleeve 193 opposite the hub 192 of the arm. The segment is on the free end of an arm 204 fixed to one end of a rockshaft 205 journaled in the traveler frame 84. The other end of this shaft is fixed to a V-shaped bell-crank 206 having arms which carry rollers 207 that bear against a pair of conjugate surfaces on the cams 201. The cam surfaces are shaped to swing the thread uptake arm 191 up and down in each revolution of the shaft at the times indicated at 24c and 25c.

After operation of the detector, the retrieved thread is released by opening of the clamp of the pick-up device 82 at 14c and the freed end portion of the thread is moved outwardly and downwardly from the S2 position to the position indicated at S3 (FIGS. 15 and 21) so as to dispose the thread beneath the stationary guide 165 on the post 54 and present the free end portion thereof opposite a nozzle opening 208 (FIGS. 15, 19 and 21) near the lower position of the uptake arm 191. There is a guide 165 on each of the clamp supporting posts 54 comprising a horizontal bar fixed to the lower end of the post directly below the upper clamp 52, a tapered end 209 projecting part way across the outer end of the V-shaped opening 95 in the top 55 of the bobbin pocket.

The path of such transfer of the thread is controlled by a blow tube 211 (FIGS. 1, 4, 7, 15 and 16) supported by brackets 212 on the casting 84 and having a generally straight intermediate portion 213 extending first downwardly and outwardly transversely of the traveler path. The lower angular portion 214 projects toward the end of the uptake arm 191 and terminates at an outlet end 215 which is disposed close to and in alinement with the nozzle opening 208 (FIGS. 7, 16 and 21) when the arm is near its lowermost position.

The upper end portion 216 of the tube communicates with a source 217 (FIG. 15) of air under pressure and is supported by a bracket 218 rigid with the tube on opposite sides of a cross-slot 219 perpendicular to the camshaft 87 and slightly wider than a flat cam disk 221 which is fixed to the end of the camshaft 87 for movement of its peripheral edge portion through the slot and formed with an elongated lobe 222 which passes through the slot and blocks the flow of air to the tube 211. Air is allowed to flow when the remaining vacant sector 223 is presented to the slot. The disk thus constitutes a valve for admitting air to the transfer tube at 26c and interrupting the flow at 27c.

In the upward movement of the retie arm 99 to lead the retrieved thread into the detector 163 and to the position S1, the thread is laid into a notch 224 (FIGS. 1, 7, 15 and 16) in the side of the blow tube and comes against the elongated bottom 225 of the notch. The latter communicates with the upper and inlet end of a slot 226 which extends along the bottom of the tube starting at the notch and twists around the tube through about a quarter revolution and terminates at the tube end 215. Somewhat below the notch 226, a slot 227 starts at 228 (FIGS. 15 and 16) and extends along the side of the tube opposite the slot 226 and terminates at the end 215.

With this arrangement, the end portion of the retrieved thread lying across the tube and in the notch 224 will, after release by opening the clamp of the pick-up device 82 at 14c and opening of the air valve at 26c, be blown downwardly in a loop 229 (FIG. 15) into the tube and will travel along the slot 226 until reaching the slot 227 from which the free end of the thread is blown outwardly. The thread then extends crosswise of the tube and through the slots 226, 227 and, at the end of the tube, comes against a stop in the form of a laterally projecting finger 231 by which it is held momentarily in the position S3 (FIGS. 15 and 21) in which the thread extends crosswise of the tube but in a different angular position than when laid into the side opening 224 at the end of the retrieval. A substantial length of the thread is thus disposed directly opposite the nozzle opening 208 and in a proper position to be sucked into the nozzle opening 208 as the latter passes the outlet end of the tube. The free end portion of the thread is sucked and drawn inwardly along the suction or uptake tube 191 as indicated at 232 (FIG. 15) until the thread becomes tensioned between the hook 96 of the thread eye 73 and the nozzle on the free end of the uptake arm 191.

Upon entering the nozzle opening 208, the thread is led transversely of the uptake arm to a position for presenting the thread properly to the upper clamp 52 when the arm reaches its upper position (FIG. 22). For this purpose, the nozzle opening 208 is formed at the outer end of a hollow member 233 (FIG. 19) on a plate 234 which is claimed to a head 235 defining the free end of the suction tube. A slot 236 communicating with the nozzle opening extends partially across the plate and terminates in a side opening or port 237 which registers with an opening 238 on the head 235 when the parts are clamped together. Preferably, the end 239 of the slot 236 is shaped as indicated as shown in FIG. 19 to trap the thread and hold the outwardly extending portion S3 thereof in a definite position relative to the uptake arm in the upward movement of the latter, the thread then extending from the underside of the head 235 as shown in FIG. 22. From the side opening 237, the end portion of the thread which is drawn into the suction tube is relatively long due to the unwinding by the outward movement of the retie arm 99 and the slack arm 164, the length being sufficient to enable the thread to be held securely in the arm under the applied suction alone and during the full upward swinging of the arm to hang up the retrieved thread in the upper clamp 52.

It will be observed that the freed end portion of the retrieved thread in being blown downwardly along the tube 211 and sucked into the opening 208 of the uptake arm 191 is lowered to a position S3 (FIG. 21) which is below the guide 165 whose end 209 projects partially across the V-shaped opening 95 in the top wall 55 of the bobbin pocket. During such lowering and in the continued advance of the traveler, the thread slides fowardly along the top of the finger 165 and off from the end of the latter and is carried backwardly by the curved outlet end 214 of the blow tube and into the pocket opening 95 so as to be trapped beneath this finger in the ensuing upward movement of the thread by the arm 191 and the accompanying backward transfer to be described presently for presenting the thread properly to the throat of the upper clamp.

Hang-up of retrieved thread

When the uptake arm reaches its upper most position at 28c, the thread will be disposed in the position S4 (FIG. 22) extending from the underside of the guide 165 upwardly to the end 239 of the slot in the head 235 on the arm and into the arm through the port 237. At this time, the arm will have advanced with the traveler to the position somewhat ahead of the upper clamp 52 in which the thread is to be hung up. Therefore, as disclosed in the above mentioned application, the picked-up end of the thread is moved backwardly along the traveler path and transversely and inwardly in order to bring the thread opposite the throat 61 of the clamp 52 for entry therein when the clamp is subsequently opened.

Such transfer of the thread is achieved by the coaction of a second suction tube 241 (FIGS. 4, 23 and 23a), a slot 242 along the bottom thereof, and a shear 245 disposed above the throat. The tube is supported cantilever fashion by the traveler frame 84 and at its supported end communicates through a pipe 244 with the vacuum source carried by the traveler. The throat 243 is V-shaped and opens outwardly as shown in FIG. 23a in the plane 255 in which the head 235 of the uptake arm 191 swings upwardly to lay the sucked in thread S4 into the throat as the arm reaches its upper position at 28c. The tube 241 is generally S-shaped and the slot 242 extends along the bottom of the tube first opposite to and then inwardly at a right angle to the traveler motion to an eye 250 which, as shown in FIGS. 23 and 23a, holds the transferred thread in the position S5 (FIG. 22) in which the thread is disposed in the vertical plane (FIG. 23a) of the upper clamp 52 in which it is to be hung in the continued advance of the traveler.

The shear 245 (FIGS. 4, 23 and 23a) is disposed immediately above the throat 243 and opens in the same direction. It comprises a fixed blade 246 projecting from the edge of a plate 247 to which the blade is fixed at 246a and coacting with a blade 248 swingable on a pivot 249. An arm 251 depending from a loose hub 252 on a shaft 265 is connected by a link 253 joined at 254 to the blade. An arm 255 projecting outwardly from the hub carries a roller 256 which follows a groove 257 in the side of a cam 258 on the main shaft. The groove is shaped to rock the blade counter-clockwise (FIGS. 4 and 23) at 29c to close the shear and cut off the thread S4 and then open the shear at 30c. This frees the thread for sidewise transfer along the tube 241 to the S5 position (FIGS. 22 and 23).

Immediately after such transfer, a plow 259 (FIGS. 4 and 23a) engages and passes by the depending lug 93 on the movable jaw 89 of the upper clamp 52 thus opening the clamp at 31c in time to receive the thread S5 at 32c after which the lug is released to allow the clamp to close at 33c so that the short trailing end of the thread is drawn out of the tube 241 as the traveler moves on. The hang-up of the retrieved thread is then complete with the thread S5 left extending vertically between the upper clamp 52 and the guide plate 165 (FIG. 22) and ready for pick-up by the tying unit 25 and tying onto the cheese in the regular way. This occurs at 262 (FIG. 6) in the sixth cycle of the camshaft following retrieving of the thread S by the pick-up device 82 at 261.

Figure 21:
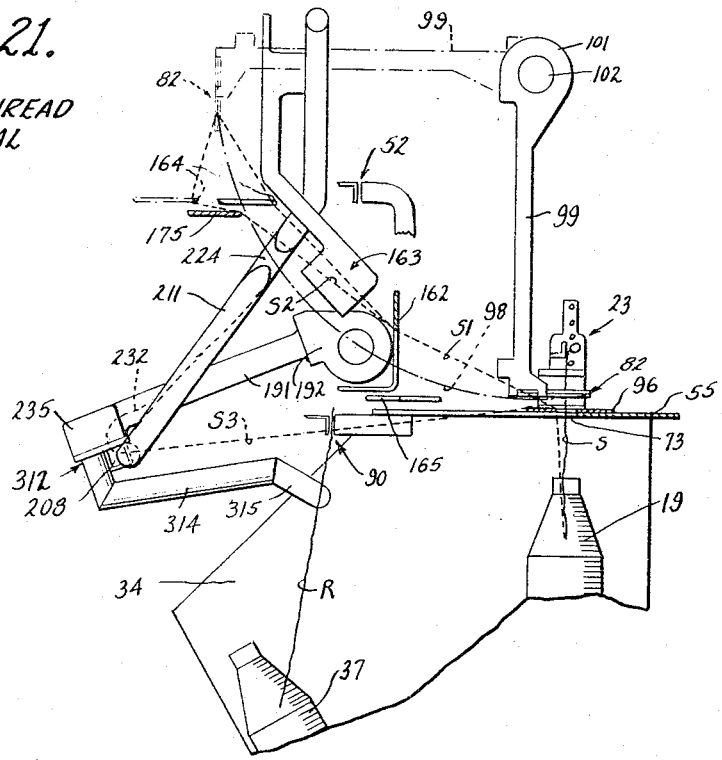

It will be noted that the pick-up device 82 in its outermost or retrieved position shown in full in FIG. 7 and in phantom in FIG. 21 is disposed well above and outwardly from the upper clamp 52 in which the thread is to be hung up, the thread then being disposed in the S1 position (FIG. 21). The substantial length of thread thus unwound from the bobbin 18 as an incident to the retrieval allows a sufficient length of the free end portion of the thread to be drawn into the uptake tube 191 to enable the applied vacuum to hold the thread taut during swinging of the tube to its upper position (FIG. 22) and during the transfer of the end of the thread into the upper clamp 52 as above described. Thus, the thread S1 in the retrieved position is long enough to remain held in the uptake arm without the necessity of clamping or otherwise fastening it to the arm.

*Retaining position of reserve bobbin and thread after successful retrieval of broken supply thread*

Figure 6:
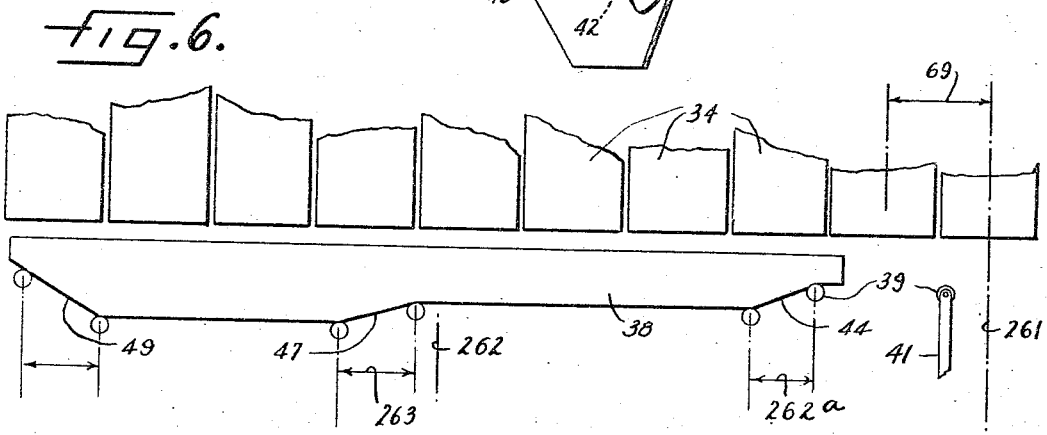
FIG. 6 is a fragmentary schematic view showing the relation of the bobbin skewering plow and the pockets of the winding units.

If the broken supply thread is retrieved successfully as above described and as determined by the inspecting action of the detector 163 at 22c, provision must be made (a) to prevent an attempted pick-up of the thread R of the reserve bobbin 37 then disposed in the pocket 34, (b) to disable the skewering mechanism above described so as to prevent doffing of the supply bobbin 18 at 262a (FIG. 6) whose thread has been retrieved, and (c) to prevent the transfer of the reserve bobbin to the supply position at 263. On the other hand, if the detector determines at 23c that an attempted retrieval of a broken supply thread is unsuccessful, mechanism later to be described is activated (d) to open the lower clamp 90, (e) pick up the reserve thread R, transfer it to and hang it up in the upper clamp 52, and (f) condition the traveler plow 38 for actuating the skewer 33 at the proper time to doff the unusable supply bobbin 18 and replace it by the reserve bobbin at 263 (FIG. 6).

These several functions are controlled by the action of the detector 163 and the idle winding unit feeler 154 acting jointly through the mechanism illustrated in FIGS. 7, 13, 24 and 26 to 29. This includes a shaft 265 paralleling the traveler motion and journaled on the casting 84. Loose on this shaft is the hub 266 of an outwardly projecting generally horizontal lever 267 carrying at its free end a follower roller 268 which rides in a groove 269 in the axial face of a cam 188 on the shaft 87 and is oscillated in each revolution back and forth between the positions shown in full in FIGS. 7 and 7a. Fast on the shaft is a bell-crank 272 having an upstanding arm 273 which is urged by a contractile spring 274 against an adjustable stop 275 on the casting 84. Another upstanding and inclined arm 276 of the bell-crank carries a block 280 and is adapted for engagement at its free end with a plate 277 on the free end of an arm 278 upstanding from the hub of the lever 267 and also is adapted for abutting engagement of its end 279 with the side of the free end of a latch 281 and a shoulder 282 thereon. The latch is fulcrumed at 283 on the underside of the lever 267 near the outer end thereof and is urged by a contractile spring 284 toward the plate 276.

The latch moves up and down continuously with the lever 267 but is prevented from swinging into engagement with the arm 276 by the blocking action of either one or both of two detents 285 and 286 engageable with the downwardly facing lower edge of a lug 287 near the fulcrum of the latch. Thus, in the upward motion of the lever 267, the latch end rides along the end of the block 280 as shown in FIG. 7 while the plate 277 and arm 278 move away from the block whose position is determined by the stop 275. In the downward stroke of the lever with one or both of the detents in blocking position, the lug 287 engages the detent causing the latter to swing away from the end of the block in the final motion of the lever.

But, if both of the detents are withdrawn during a downstroke of the lever 267, as shown in FIG. 7a, the end of the latch will move against the end of the block as the shoulder passes the latter just as the plate 277 comes against the block 280. The arms 276 and 278 are thus locked together so that in the up and down motion of the lever 267, the shaft 265 will be rocked clockwise and counter-clockwise. This condition obtains until one or both of the detents has been moved back into blocking position beneath the latch lug 287. Then, in the next downward stroke of the lever 267, the latch will be rocked counter-clockwise as the lug engages the blocking detent thus swinging the latch and the shoulder 282 out of engagement with the block 280.

*Positioning blocking detents.*—The detent 285 is on the upper end of the arm 182 (FIG. 13) which carries the movable jaw 177 of the detector 163. It is disposed in the blocking position (FIGS. 13 and 24) when this arm is retracted by its cam 187 or when, after release of the jaw to the spring 186 at 20c, the jaw is blocked at 22c by a retrieved thread as shown in FIG. 14. In the absence of a thread during the inspecting action by the detector, the jaw moved by the spring 186 past the fixed jaw 176 at 23c and as shown in phantom in FIG. 14 thus swinging the lever 182 counter-clockwise (FIG. 13) out from beneath the lug 287 to the position shown in phantom. Thus, the detent is withdrawn only during the inspecting action 23c by the detector when there is no thread present. At all other times, the detent will be disposed in blocking position.

The detent 286 is controlled by the feeler 154 which detects the idle or running condition of each winding unit 10. As shown in FIG. 24, a depending link 288 connects the feeler to the free end of a crank 289 fast on a rockshaft 291 which is journaled in the frame 84 and carries at its other end a depending crank 292 from which the detent 286 is formed as a right angularly projecting lug.

As shown in FIG. 24, the detent 286 is in blocking position when the feeler is in its upper position as will be the case when the feeler end 159 passes an active winding unit whose cheese arm 15 is in winding position. But when the feeler is depressed in passing under the arm 15 of an idle winding unit, the shaft 291 is rocked counter-clockwise and the detent 286 is withdrawn from the path of the latch lug 287.

It will thus be seen that both of the detents 285 and 286 will be withdrawn when the attempted retrieval of a broken thread S has been unsuccessful and, in addition, the cheese arm 15 of a unit reached by the feeler 15 is in idle position. Under this combination of conditions only does it become desirable to doff the supply bobbin 18, open the lower clamp 90, transfer the reserve thread R from the lower clamp to the upper clamp 52, and skewer the reserve bobbin into the supply position.

*Selective control of reserve bobbin skewering*

The motions of the shaft 265 controlled by the detector 163 and the cheese arm feeler 154 as above described are utilized to permit or prevent actuation of the plunger 41 to skewer the reserve bobbin or by-pass the same. For this purpose, a crank 293 (FIGS. 24 and 26) is fixed to the shaft 265 connected through a link 294 to a latch 295 which extends along the top edge of the skewering plow 38 and is pivoted at 296 on the plow at a point spaced rearwardly from the inclined leading end of the plow.

A bracket 297 projecting from the side of the plow carries an upright pivot 298 supporting the forked central portion of a bell-crank 299 urged by a spring 301 counter-clockwise as viewed in FIGS. 28 and 29 to a position determined by engagement of a stop 302 with the side of the bracket (FIG. 28). The latch engages the trailing side of a lateral projection 303 on the upper part of the fork. An incline 304 on the leading end of the lower part of the fork is disposed in the plane of the upper end of the skewer plunger 41 and normally extends laterally across the inclined leading end of the plow. When the latch is engaged behind the arm as shown in FIGS. 27 and 28 as will be the case until the shaft 265 has been rocked clockwise as above described, the bell-crank 299 will be blocked against clockwise swinging and the incline 304, when it encounters a plunger 41, acts to cam the roller and plunger laterally to the position shown in FIGS. 26 and 28. Thus, the plunger is cammed laterally and outwardly about the pinion 42 as a fulcrum as permitted by the slot 50 and thus becomes disposed out of the plane of the plow surface 44. The plow thus by-passes the plunger 41 which remains inactive against the side of the plow (FIG. 28) until the trailing end portion 49 (FIG. 6) of the plow passes the roller. As a result, the bobbin 37 remains in the reserve position in the pocket 34.

On the other hand, if the shaft 265 is rocked counter-clockwise by the cam groove 268, the latch 295 will be withdrawn upwardly so that when the inclined surface 304 encounters the plunger 41, it and the bell-crank 299 will be cammed about the pivot 298 out of the plane of the plow. The inclined end 44 of the latter thus comes into engagement with the roller 39 so as to cam the plunger 41 downwardly and skewer the reserve bobbin as the plow passes (FIG. 29).

*Release of reserve thread from lower clamp*

Before skewering of a reserve bobbin 37 and transferring the same to the supply position as above described, the thread R thereof, as previously hung up manually in the lower clamp 37, is released from this clamp, picked up by the free end of the uptake arm 191, and transferred upwardly into the upper clamp 52. This is accomplished by the plow 94 (FIG. 24) above described on the free end of an arm 305 fixed to the free end of a crank 306 which is fast on the lower end of an upright shaft 307 journaled in the frame 84. Fast on the upper end of the shaft is an arm 308 connected at its free end and through a link 309 with the free end of a crank 311 depending from and rigid with the hub of the bell-crank 272 which is fast on the shaft 265.

When the shaft 265 is in the idle position, the plow 94 is disposed out of alinement along the traveler path with the lug 93 of the lower clamp as shown in FIG. 24 so as to pass by this lug without opening the clamp to release the reserve thread therefrom. This condition obtains whenever an attempted retrieval of a broken thread has been successful or the winding unit 10 then associated with the retrieval parts is running properly so that one or both of the detents 285, 286 will remain in blocking position thus preventing clockwise rocking of the shaft 265.

But if the shaft 265 has been rocked clockwise, the upright shaft 307 will be turned to move the plow 94 at 36c to the active position shown in phantom FIG. 24, the plow engages the lug 93 in passing by the latter and opens the clamp at 34c while allowing the clamp to reclose at 35c, the plow returning to inactive position at 37c.

*Pick-up and transfer of released reserve thread to uptake arm*

When the reserve thread R is released from the clamp 90 it is picked up immediately and sucked into a second nozzle 312 (FIGS. 7 and 15 to 20) on the free end of the tubular uptake arm 191 as the latter is moving downwardly at 25c and approaching its lower position as shown in FIGS. 7 and 20. This nozzle is defined by the short end portion 316 of an L-shaped tube 314 supported by the head 235 of the uptake arm 191. Herein, the tube end 316 is telescoped into and welded in a circular hole 317 in plate 234 adjacent the opening 237 through which the retrieved broken thread enters the uptake arm, both openings registering with the hole 238 in the head when the plate is clamped thereto. From its outer end 316, the tube 314 extends inwardly toward the clamp 90 and terminates in an inclined portion 315 of semi-circular cross-section which is disposed somewhat below the level of the clamp 90 and extends across the plane of the thread R as hung up in this clamp (see FIG. 20).

When the uptake arm apporaches its lower position (FIGS. 7 and 20), the leading face of the transfer tube end 315 comes against the reserve thread in position R (FIG. 20) just as the latter is released by the plow 94 at 36c. The thread slides outwardly along the end portion 315 to the iner end of the tube proper and is sucked into the latter through the inner end of the slot 318 which extends along the bottom of the tube around the bend all the way to the nozzle 312 where it terminates at 319 adjacent the opening 317. The freed end portion of the thread enters the uptake tube 191 through the opening 317 and is long enough to extend part way along the tube as indicated at R1 (FIGS. 18 and 20), the thread extending downwardly from the head 235 adjacent the position which a retrieved broken thread S4 (FIG. 17) occupies after being sucked into the uptake tube.

*Clamping reserve thread in uptake arm*

Transfer of the reserve thread R1 by the uptake arm arm 191 from the lower clamp 90 to the upper clamp 52 requires the unwinding of additional thread off from the reserve bobbin 37. This is accomplished by pressing the thread against one side wall 321 (FIG. 18) of the nozzle opening 317, this wall constituting the fixed jaw of a clamp 325. For this purpose, a flat L-shaped bar 322 lying along the underside of the uptake arm projects into and is slidable in a slot 323 in the inner face of the head plate 234. The inner short leg 324 of the bar cooperates with the jaw 321 of a clamp which is closed at 39c after the reserve thread has been sucked into the uptake tube 191 through the nozzle 312 past the clamp as the tube is approaching its lower position at 25c. The thread is thus moved from the entering position shown in full in FIG. 18 and pressed against the jaw 321 to the position shown in phantom. With the thread thus held, additional thread will be drawn off from the reserve bobbin as the uptake arm swings upwardly to present the thread, then suspended from the underside of the arm to the upper clamp 52.

Referring to FIGS. 15, 20, 24 and 30, the clamp 325 is opened and closed at 38c and 39c by the same clockwise and return movements of the shaft 265 which cause the release of the lower clamp and the skewering of the reserve bobbin as above described. For this purpose, the elongated outer end portion of the clamp bar 322 lies along the outer side of the tube 191 and is slidable endwise in the slot 323 and a spaced guide 327. It is urged inwardly or in the direction to close the clamp by the force of a tension spring 328 (FIG. 17) acting between lugs 329 and 331 on the bar and tube. Retraction of the bar to open the clamp is produced in the clockwise turning of the shaft 265 by the cam 269 acting through the cranks 308, 311, link 309 and the upright rockshaft 307. A crank 339 fast on the lower end of this shaft bears at its free end 338 (see FIG. 25) against the end of a rod 341 guided in the end walls 195, 196 of the sleeve 193. At the opposite end, the rod bears against one end of a lever 342 fulcrumed at 343 on the tube 191 and bearing at its other end against an abutment 344 on the clamp bar 322, the latter being held by the spring 328 against the lever 342 and also urged thereby in the direction for closing the clamp 325. With the rod 341 extending along the axis of the arm 191 and having bearing engagement with the arm 342 on this axis, the motion of the cam 269 is transmittable to the clamp bar in all positions of the uptake arm.

*Preventing reserve thread pick-up after broken thread retrieval*

It will be apparent from the foregoing that in each cycle of the camshaft 87 when the winding unit 10 being passed by the retie arm is not running as evidenced by location of the cheese in idle position, a retied broken thread S will be sucked into the uptake tube 191 through the nozzle opening 208 or alternatively, a reserve thread R will be sucked into the tube through the nozzle 312. Since the vacuum is applied to two nozzles from a common source, the nozzle 208 must always be open when the attempted retrieval of a broken thread S is successful, the port 237 (FIG. 17) must be closed and the port 317 of the nozzle 312 open when the reserve thread is sucked through the transfer tube 314.

This is accomplished in accordance with one aspect of the present invention by using the clamp member 324 as a two-way valve which uncovers the port 237 (FIG. 17) at 43c and closes the port 317 as indicated at 42c and 43c when the rockshaft 265 is disposed in its idle position (FIGS. 7 and 24) and allowing the valve slide 322 to be moved by the spring 328 in the port and clamp closing direction at 39c just after a reserve thread has been sucked in through the nozzle 312, the thread then being held in the uptake arm 191 at 44c as the arm swings upwardly in the ensuing stroke 24c. Thus, the uptake arm is conditioned selectively for picking up either a retrieved supply thread S or a released reserve thread R whichever of the two is presented to the nozzles 208 and 312. At the same time, the valve slide performs at the proper time the additional function of securing the sucked in reserve thread to the uptake arm. As indicated at 43c, the slide 322 remains in the position shown in FIG. 7 with the port 237 held open whenever the cheese arm feeler 154 indicates that the winding unit is running properly or the detector 163 indicates the successful retrieval of a broken thread S (23c). But, if the attempted retrieval is unsuccessful as indicated by the detector (22c) or the feeler 154 is depressed (16c) by the arm 15 of an idle winding unit, the corresponding reserve thread will be released (34c) and sucked into the nozzle 312 after the valve port 317 has been opened (38c), the skewer plunger 41 being activated to cause later transfer of the reserve bobbin to the supply position.

*Reserve thread guiding during hang-up*

To maintain the unwinding pull on the reserve thread along the axis of the reserve bobbin during the final part upward movement of the uptake arm, a movable guide 346 (FIGS. 20, 23 and 23a) is arranged to engage the thread between the bobbin and the partially raised nozzle and hold the thread substantially alined vertically with the reserve bobbin. Herein, the guide is an elongated finger which projects transversely of the traveler path as shown in FIG. 23a at the start of unwinding and is on the free end of an arm 347 fixed to the lower end of an upright rockshaft 348 on the frame 84 and carrying at its upper end a crank 349 (FIG. 23) pin and slot coupled to one end of an arm 351 connected to a reciprocable rod 353 supported by a parallelogram linkage 352. The rod carries a follower 355 which is held by a spring 356 against the periphery of the cam 357 which is shaped to swing the thread outwardly at 40c as shown in FIG. 23. The thread is then disposed in the position R2 (FIG. 20). Then the finger swings inwardly at 41c to allow the thread to slide off as the uptake arm approaches its upper position and carries the thread into the throat 243 and the shear 245 and to the position R3 the same as in handling and positioning the retrieved thread S4 (FIG. 22) as above described. The thread is cut off by the shear 245, sucked along the tube slot 242 to the eye 250 and carried into the upper clamp 52 by the traveler in the same manner as the retrieved broken thread.

*Summary*

It will be apparent that the mechanisms described above operate during the approach of the traveler 12 to each successive winding unit 10 to perform the following functions.

(1) Sense the condition of each unit and remain inactive if the unit is operating properly with a thread 18 running from the supply bobbin 19 to a package 13 being wound.

(2) Assume that in an idle winding unit the supply thread has been broken at the clearer 23 and attempt a retrieval of such a thread including severing the thread below the clearer, gripping the supply end S of the severed thread, drawing this end upwardly and then outwardly and transversely of the traveler path to a retrieved position S1.

(3) Detecting the presence of absence of a thread in the retrieved position S1 and the presence or absence of the corresponding thread package in idle position.

(4) If the retrieval has been successful and the winding unit is idle, transfer the retrieved thread to and hang the same in the upper clamp 52.

(5) If the attempted retrieval is unsuccessful, pick up and grip the exposed part of the thread of the reserve bobbin 37 and draw the same upwardly and hang it in the upper clamp.

(6) If the retrieval is unsuccessful and the winding unit is idle, doff the supply bobbin 19 and transfer the reserve bobbin 37 to the supply position.

The foregoing functions occur in a sequence accurately timed by the camshaft 87 and with the movement of the traveler 12 so as to position either broken and retrieved thread of each supply bobbin or the reserve thread of such unit for later servicing in the regular way by the tying unit of the traveler. As a result, each of the winding units is inspected as the traveler approaches to determine whether it is running properly or the thread of the supply bobbin broken, in which case outward retrieval is attempted and the retrieved thread is hung up for servicing by the traveler and reuse in resuming the winding of the package. But, if the attempted retrieval is unsuccessful, the reserve thread is picked up and placed in the upper clamp. As a result, there is an attempted retrieval of each thread after each breakage and, if these retrievals are successful, the bobbin remains in the supply position until its thread becomes exhausted, a condition which is detected by failure of an attempted retrieval and leads to the substitution of the reserve bobbin. A substantial saving in operating of the winder is achieved in minimizing the rehandling of the doffed bobbins and loading new bobbins in the pockets which become empty in a majority of instances only after exhaustion of the bobbin in the supply position.

I claim as my invention:

1. For use in a multiple unit thread winding machine including a first frame, a row of winding units thereon each including a thread running upwardly from a supply bobbin through a thread clearer, and an upper clamp for releasably receiving a thread for pick-up and tying to the broken thread of the package being wound, a servicing unit including a second frame, a tying unit and a rotating shaft thereon, and means for moving said winding units and servicing unit relative to each other continuously along a predetermined path to bring each successive winding unit into operative association first with said second frame and then with the tying unit, the combination of, an elongated member mounted on said second frame for movement transversely of said path of relative movement, actuating means driven from said shaft in timed relation to such movement and advancing said member toward the thread of the associated winding unit and then retracting the member away from such thread before becoming associated with the next winding unit, a pick-up device carried by said member, means operated in timed relation to the advance movement of said member to actuate said device and cause the same to engage and grip a broken thread suspended from the clearer of a winding unit and then retract the held end, unwind additional thread from the supply bobbin, and locate the thread in a retrieved position at the completion of the retraction, and mechanism operated from said shaft to grip the retrieved thread, transfer the same upwardly to and hang it up in said upper clamp of the winding unit including release of the retrieved thread from said pick-up device.

2. The combination as defined in claim 1 in which said pick-up device includes a clamp actuated from said shaft so as to be opened in the approach of the device to a broken thread and then close after the thread has been received in the clamp.

3. The combination as defined in claim 2 in which said pick-up device includes a shear operable during the closing of said clamp to cut off the broken thread below the thread clearer in which it is suspended.

4. The combination as defined in claim 2 including stationary guides disposed below said upper clamps of the winding units, and means acting subsequent to the thread retrieval to position the retrieved thread below said guide of the winding unit whereby the thread as hung up in said upper clamp is disposed between the clamp and said guide in an upright position for subsequent pick-up by said tying unit.

5. The combination as defined in claim 4 in which said supply bobbin is supported in a pocket disposed below the apex end of a notch in the top of the pocket and opening transversely of said path of relative movement and in the direction of the retraction of said member, and said guide comprises a finger projecting in the direction of such relative motion and partially across the open end portion of said notch whereby to permit the broken thread, after its retrieval, to be transferred to a position below the guide.

6. The combination as defined in claim 1 including a detector associated with the thread after retrieval by said pick-up device, and means on the second frame operating said detector before completion of the hang-up by said mechanism and acting to sense and indicate the presence or absence of a retrieved thread held by the pick-up device.

7. The combination as defined in claim 6 in which said detector comprises fixed and movable jaws on said second frame cooperating to receive the broken thread between them in the retrieved position thereof, and means urging said movable jaw toward and past the fixed jaw, said detector operating means holding said movable jaw retracted until the retrieved thread has been laid in the detector and then releasing such jaw for movement to a position blocked by the thread or past the fixed jaw in the absence of a thread.

8. The combination defined in claim 1 including means supporting said thread package and moving the same from a winding position to an idle position when the thread breaks, a feeler mounted on said second frame and operable to sense the idle condition of the unit associated with said member, and mechanism controlled by said feeler and acting on said operating means during the approach of said pick-up device to a supply thread to maintain said pick-up device inactive when said package is in said winding position whereby to prevent gripping of a thread then running from said supply bobbin to the package.

9. The combination as defined in claim 8 in which said thread package is carried on the free end of an arm which, in the idle position of the winding unit, is disposed in a predetermined position transversely of said path and said feeler is mounted on said second frame for engagement with said arm and is spring urged in one direction to an inactive position while being cammed in the opposite direction to an active position upon engagement with said arm in said idle position during relative movement between said winding and servicing units.

10. The combination as defined in claim 9 in which said operating means for said pick-up device includes a first part mounted on said second frame end continuously reciprocable back and forth in timed relation to said relative movement, a second part coupled to a linkage extending to said pick-up device, and a detent carried by one of said parts and movable by said feeler into and out of blocking relation with the other part.

11. The combination as defined in claim 1 in which said member is an arm fulcrumed on said second frame to swing transversely of said path about an axis spaced above said thread clearer and between a depending position in which said pick-up device engages a broken thread suspended from said clearer and a retrieved position in which said device is disposed adjacent said path on the side thereof opposite said upper clamp.

12. The combination as defined in claim 11 in which said arm and the pick-up device thereon is disposed above said upper clamp when in said retrieved position.

13. The combination as defined in claim 1 in which said thread pick-up device comprises a jaw fixed to said member and extending transversely of said path of relative movement while facing in a direction opposite to such movement, and a movable shearing blade pivoted on said member and having a shearing edge cooperating with said fixed jaw in approaching a broken supply thread to define a notch for receiving the thread in the advanced position of the member, said mechanism acting to move said movable jaw away from said fixed jaw and then toward and past the fixed jaw after the broken thread has been received in said notch as said member reaches its inner position.

14. The combination as defined in claim 13 including a finger projecting laterally from one of said jaws and defining the bottom of said notch.

15. The combination as defined in claim 13 in which said member is a crank arm fulcrumed on said second frame to swing about an axis paralleling said path of relative movement and said movable jaw is actuated through a linkage including an element extending through said arm and disposed on and reciprocable along said axis.

16. The combination as defined in claim 1 in which each of said winding units includes a guide on said first frame disposed above said supply bobbin and acting during the retrieving motion of said member to lead the thread endwise from such bobbin along an upright line.

17. The combination as defined in claim 16 in which said guide comprises a stationary hook disposed above said supply bobbin and opening transversely of said path in direction of advance of said pick-up member whereby to trap the broken thread during retrieval thereof in the retraction of the member while permitting subsequent lateral transfer of another upright thread in said direction past the free end of the hook.

18. For mounting on the traveler of a Barber-Colman type multiple unit thread winding machine having a row of winding units each with a thread running upwardly from a supply bobbin successively through a thread clearer, an adjacent pocket with a reserve supply bobbin therein, an upper clamp for releasably receiving the reserve thread for pick-up and tying to the broken thread of a package being wound while a traveler, with a rotating shaft thereon, is moving continuously past the winding units, the clamps of successive winding units being on upright posts spaced along the traveler path outwardly from the thread clearers, the combinaton of, a frame mounted on said traveler in advance of a tying unit thereon to move with the traveler, a camshaft on said frame driven continuously by said shaft in timed relation to the traveler movement, an elongated member mounted on said frame and moved continuously back and forth by said camshaft transversely of said path first inwardly as the member passes a first one of said posts and then outwardly before reaching the next adjacent one of said posts, a clamping device mounted on the free end of said member for engagement in its innermost position with a broken supply thread suspended from the one of said clearers associated with said first post, means actuated from said camshaft and actuating said device during such thread engagement to clamp and grip the thread whereby additional thread is unwound from the supply bobbin and the gripped thread is retrieved and drawn outwardly past said posts, and a guide on each winding unit disposed above said supply bobbin and acting during the retrieving motion of said member to lead the thread endwise off from such bobbin along an upright line and retain the supply end portion of the retrieved thread along such line.

19. For use in a multiple unit thread winding machine including a first frame, a row of winding units each including a thread running upwardly from a supply bobbin through a thread clearer, an upper clamp for releasably receiving a thread for pick-up and tying to the broken thread of a package being wound during relative movement between a servicing unit and said winding units along a predetermined path during which said units are brought successively into operative association with the servicing unit, the combination of, a second frame mounted on said servicing unit in advance of a tying unit thereon and disposed laterally of said path from the thread clearers, a camshaft on said second frame driven continuously in timed relation to said relative motion, a member mounted on said second frame and moved by said camshaft during each cycle thereof transversely of said path first to the thread of said bobbin and then reversely, a pick-up device on said member operable in the advance of the member during each of said cycles to engage and grip a broken thread suspended from the clearer of one of said units and then retract the held end and locate the thread in a retrieved position, a second pick-up device on said second frame spaced from the first pick-up device when the latter is holding the thread in said retrieved position, a thread transfer member mounted on said second frame for movement therewith and operable, when activated, to receive and engage the thread in said retrieved position and, upon release of the thread, transfer the freed end portion of the thread to said second device, and mechanism operated from said camshaft to release the retrieved thread from said first device, activate said transfer member to transfer the thread to said second device, and then move the latter device upwardly to said upper clamp of the winding unit and hang up the retrieved thread in such clamp.

20. The combination as defined in claim 19 in which said transfer member is a tube fixed on said second frame and extending transversely of said path of relative movement, said tube having an inlet extending across and receiving the broken thread in said retrieved position and an outlet for delivering the thread to said second device for pick-up thereby, said tube having a slot extending along the side thereof to allow the thread to pass along the tube while the thread remains attached to said supply bobbin, and means operable from said camshaft to admit air under pressure to said tube inlet whereby to blow the retrieved and released thread into the tube along said slot and to said outlet.

21. The combination as defined in claim 20 in which the broken thread in reaching said retrieved position is laid in an opening in the side of said tube at the inlet end of said slot.

22. The combination as defined in claim 21 including a slot extending along the outlet end portion of said blow tube to the outlet end thereof and disposed on the side of the tube opposite said first slot.

23. The combination as defined in claim 21 including a finger projecting laterally from said tube at the outlet end thereof and operating to momentarily stop the thread blown through the tube in a position extending crosswise of the tube whereby to facilitate pick-up of the thread by said second device.

24. The combination as defined in claim 23 in which said finger is disposed in a position to stop the thread in an angular position relative to the tube different from that in which the thread is disposed when in said retrieved position.

25. The combination defined in claim 20 in which said mechanism includes an evacuated tubular arm carrying said second pick-up device and swingable transversely of said path and in timed relation to the blowing of thread through said tube, means for swinging said arm in timed relation to said relative movement to move said second device between a lower position adjacent said tube outlet and upper position presenting the thread adjacent said upper clamp, and said second device includes a nozzle opening disposed on the leading side of the free end of said arm and disposed adjacent and opposite to said tube outlet after arrival of the retrieved thread.

26. The combination as defined in claim 19 in which said second pick-up device is on the free end of an evacuated tubular arm swingable transversely of said path in timed relation to the movements of said first pick-up device and in which the broken thread unwound from the supply bobbin in the movement of the broken thread to said retrieved position as determined by the retracted position of said first pick-up device is of sufficient length to remain held by the said second device during the full upward movement of the tubular arm by said mechanism.

27. For use in a multiple unit thread winding machine including a first frame, a row of winding units thereon each including a thread running upwardly from a supply bobbin through a thread clearer, and an upper clamp for releasably receiving a thread for pick-up and tying to the broken thread of the package being wound, a servicing unit including a second frame, a tying unit and a rotating shaft thereon, means for moving said winding units and servicing unit relative to each other continuously along a predetermined path to bring each successive winding unit into operative association first with said second frame and then with said tying unit, and means supporting a reserve bobbin adjacent each supply bobbin of the winding units with an unwound portion of the reserve thread exposed and disposed in a predetermined position relative to the bobbin, the combination of, a member mounted on said second frame for movement transversely of said path of relative movement, actuating means driven from said shaft in timed relation to such movement and advancing said member toward the thread of the associated winding unit and then retracting the member away from such thread before becoming associated with the next winding unit, a pick-up device carried by said member and operable in the advance movement thereof to engage and grip a broken thread suspended from the clearer of the winding unit and then retract the held end, unwind additional thread from the supply bobbin, and locate the thread in a retrieved position at the completion of the retraction, a detector for sensing the presence or absence of a retrieved supply thread, mechanism actuated from said shaft in timed relation to said relative movement to pick up the retrieved thread if present in said retrieved position, transfer this thread upwardly to and hang the same up in said upper clamp, and mechanism controlled by the detector and actuated in timed relation to said relative motion in the absence of such a retrieved thread, to pick up said exposed portion of the corresponding reserve thread, transfer the same upwardly to and hang the thread in said upper clamp.

28. The combination as defined in claim 27 in which the thread of each reserve bobbin of each winding unit is hung up in a second clamp disposed below the upper clamp of the unit, and means actuated from said shaft in timed relation to said relative movement and under the control of said retrieved thread detector to release the reserve thread from the second clamp at the time for pick-up thereby by said hang-up mechanism.

29. The combination as defined in claim 27 in which said reserve thread is picked up and sucked into a nozzle on the free end of a suction tube mounted on said second frame to swing upwardly from a lower pick-up position to an upper position presenting the thread adjacent said upper clamp.

30. The combination defined in claim 27 in which said mechanism includes a thread transfer arm mounted on said second frame and swung transversely of said path of relative motion alternately back and forth downwardly to bring its free end into operative association with both the retrieved and reserve threads of one of said winding units and then upwardly to carry a picked up one of the threads to said upper clamp, a first device on said free end of said arm for picking up and holding a retrieved thread when said arm is near its lower position, a second device on said free end adjacent said first device for picking up and holding a reserve thread, a detector for sensing the presence of a retrieved supply thread in said retrieved position, and mechanism controlled by said detector and controlling the selective operation of said second device to render it operative in the absence of a retrieved thread.

31. The combination as defined in claim 30 in which the threads of the reserve bobbins are hung up in second clamps disposed below the corresponding upper clamps of the winding units and said second device is adapted to pick up a reserve thread when said arm is in said lower position, said combination including means controlled selectively by said detector and operating to release from its lower clamp the reserve thread which is to be picked up in the absence of a retrieved thread.

32. The combination as defined in claim 30 in which said thread transfer arm is a suction tube subjected to a vacuum and said pick-up devices comprise nozzle inlet openings disposed opposite the retrieved and reserve thread ends when the arm is in said lower position and adapted, when one or the other of said threads is released, to draw a length of such thread into the tube, valve means including a member movable between a position closing and opening the nozzle through which the reserve thread is drawn into the tube, and means controlled by said detector in the presence of a thread in said retrieved position for moving said valve member to close the reserve thread nozzle when said arm is near its lower position.

33. The combination as defined in claim 32 including a clamp element movable with said valve member after entry of the reserve thread into said tube to close the reserve thread inlet and secure the sucked in thread to said tube.

34. The combination defined in claim 32 in which the inlets of said two nozzle openings face in different directions and including guide slots communicating with such inlets for leading the sucked in threads inwardly relative to the tube end to positions close to each other and for locating the outwardly extending portion of each thread in a position for proper transfer to said upper clamp of the associated winding unit.

35. The combination as defined in claim 32 in which said valve member, when closing the reserve thread inlet port in said tube, constitutes a clamp for securing the thread to said tube and in which the movement of said valve member to effect final closure of the clamp occurs after the reserve thread has been sucked into the tube.

36. The combination as defined in claim 32 in which said valve means comprises ports for entry of said retrieved and reserve threads disposed side by side and said valve member comprises a slide movable across the reserve thread port and transversely of said tube.

37. The combination as defined in claim 35 in which said valve slide projects outwardly from said tube and is actuated through a linkage having one part extending along the exterior of the tube and a part extending through the inner end of the tube along the pivotal axis thereof.

38. For use in a multiple unit thread winding machine including a first frame, a row of winding units thereon each including a thread running upwardly from a supply bobbin through a thread clearer, and an upper clamp for releasably receiving a thread for pick-up and tying to the broken thread of the package being wound, a servicing unit including a second frame, a tying unit and a rotating shaft thereon, means for moving said winding units and servicing unit relative to each other continuously along a predetermined path to bring each successive winding unit into operative association first with said second frame and then with the tying unit, and means supporting said package on said first frame for movement from a normal winding position to an idle position in response to breaking of the running thread, the combination of, a camshaft on said second frame rotated in timed relation to said relative motion and executing a cycle for each winding unit associated with said servicing unit, a thread pick-up device mounted on said second frame for movement transversely of said path into and out of engagement with the supply threads of successive ones of said units, a first mechanism operable selectively to actuate said device during such engagement if the thread is broken, clamp the thread below said clearer and draw the supply end thereof outwardly to a retrieved position, a sensor for detecting the presence or absence of a broken thread in said retrieved position, a second sensor for detecting the presence or absence of the corresponding thread package in said idle position, a second mechanism controlled by said sensors and operated from said camshaft to pick up the retrieved thread and hang the same in said clamp when there is a thread in said retrieved position, or, alternatively, in the absence of a retrieved thread in said position when the associated winding unit is idle, to pick up the exposed portion of said reserve thread, draw the same upwardly and hang it in said upper clamp, and means controlled by said sensors during association with each of said units and actuated from said camshaft to doff said supply bobbin if the retrieval of its thread has been unsuccessful and the winding unit is idle.

39. The combination as defined in claim 38 in which the unwound portion of each reserve thread is hung up in a second clamp disposed below the associated first clamp and said second mechanism operates to transfer the reserve thread from said second clamp to the upper clamp.

40. The combination as defined in claim 39 including means controlled selectively by said retrieved thread sensor while the corresponding winding unit is idle to control the opening of said second clamp.

41. A winding machine as defined in claim 38 in which said first mechanism is controlled by said second sensor to render said pick-up device inactive when the thread engaged thereby is running upwardly.

42. A winding machine as defined in claim 38 in which said second mechanism is controlled by a driven member movable back and forth between a first position which causes said retrieved thread to be hung up in said first clamp and said doffing means to be disabled and a second position which causes said reserve thread to be hung up in said clamp and said reserve bobbin to be transferred to the supply position, a driving member reciprocated back and forth in each camshaft cycle, and means controlled by said retrieved thread and idle winding unit sensors to control the coupling of said driving and driven members together and locate the driven member in said first position in the presence of a retrieved thread and an idle winding unit and in the second position in the absence either of a retrieved thread or an idle winding unit.

43. A winding machine as defined in claim 40 in which said doffing means is controlled by said driven member and rendered active when the member is in said second position and disabled when the member is in said first position.

References Cited

UNITED STATES PATENTS

| | | | |
|---|---|---|---|
| 2,338,914 | 1/1944 | Esser et al. | 242—35.6 |
| 2,365,701 | 12/1944 | Higgins | 242—35.6 |
| 2,395,462 | 2/1946 | Cotchett | 242—35.6 |
| 2,733,870 | 2/1956 | Furst | 242—35.6 |
| 2,769,599 | 11/1956 | Furst | 242—35.6 |
| 2,936,130 | 5/1960 | Reiners et al. | 242—35.6 |
| 3,023,974 | 3/1962 | Furst | 242—35.6 |
| 3,030,040 | 4/1962 | Reiners | 242—34.6 |
| 3,077,311 | 2/1963 | Furst | 242—35.5 |
| 3,121,540 | 2/1964 | Furst | 242—35.5 |
| 3,168,257 | 2/1965 | Perry | 242—35.5 |
| 3,281,088 | 10/1966 | Isamu Matsui et al. | 242—35.6 |

STANLEY N. GILREATH, *Primary Examiner.*